(12) United States Patent
Nishio et al.

(10) Patent No.: US 9,246,574 B2
(45) Date of Patent: Jan. 26, 2016

(54) INCREASE BASE STATION COVERAGE THROUGH EFFICIENT RELAY STATION BACKHAUL COMMUNICATION USING CARRIER AGGREGATION

(75) Inventors: Akihiko Nishio, Osaka (JP); Ayako Horiuchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 140 days.

(21) Appl. No.: 14/002,609

(22) PCT Filed: Apr. 13, 2012

(86) PCT No.: PCT/JP2012/002565
§ 371 (c)(1),
(2), (4) Date: Aug. 30, 2013

(87) PCT Pub. No.: WO2012/147296
PCT Pub. Date: Nov. 1, 2012

(65) Prior Publication Data
US 2013/0336201 A1 Dec. 19, 2013

(30) Foreign Application Priority Data

Apr. 27, 2011 (JP) ................................ 2011-099477

(51) Int. Cl.
*H04B 7/155* (2006.01)
*H04L 1/16* (2006.01)
(Continued)

(52) U.S. Cl.
CPC .......... *H04B 7/15542* (2013.01); *H04L 1/0041* (2013.01); *H04L 1/0073* (2013.01); *H04L 1/1607* (2013.01); *H04L 1/1635* (2013.01); *H04L 1/1854* (2013.01); *H04L 5/001* (2013.01); *H04L 5/0044* (2013.01);
(Continued)

(58) Field of Classification Search
None
See application file for complete search history.

(56) References Cited

U.S. PATENT DOCUMENTS

2012/0069793 A1* 3/2012 Chung et al. ................. 370/315
2012/0082085 A1   4/2012 Horiuchi et al.
(Continued)

FOREIGN PATENT DOCUMENTS

| WO | 2010/150517 A1 | 12/2010 | |
| WO | WO 2010137839 A2 * | 12/2010 | ............... H01L 1/18 |
| WO | WO 2010137926 A2 * | 12/2010 | ............. H04B 7/155 |

OTHER PUBLICATIONS

NTT Docomo, "Combination of carrier Aggregation and Relay in Rel-10", 3GPP RAN1 meeting, R1-110243.
(Continued)

*Primary Examiner* — Ian N Moore
*Assistant Examiner* — Justin T Van Roie
(74) *Attorney, Agent, or Firm* — Pearne & Gordon LLP

(57) ABSTRACT

A relay station (200) is used in communication systems in which PCells and SCells are used in backhaul communication between a base station (100) and the relay station (200), DL BHSFs of the PCell used in the downlink in backhaul communication and UL BHSFs of the PCell used in the uplink in backhaul communication are set, and UL BHSFs are a prescribed number of subframes after a DL BHSF. An ACK/NACK generation unit (203) generates a response signal for a downlink signal received in the PCell and SCells from a base station (100). A transmission unit (205) transmits in a UL BHSF of a PCell a response signal for downlink signals received in SCells in a subframe other than the DL BHSF of the PCell.

7 Claims, 10 Drawing Sheets

(51) Int. Cl.
    *H04W 16/26* (2009.01)
    *H04L 5/00* (2006.01)
    *H04L 1/18* (2006.01)
    *H04W 28/06* (2009.01)
    *H04W 84/04* (2009.01)
    *H04W 88/08* (2009.01)
    *H04L 1/00* (2006.01)

(52) U.S. Cl.
    CPC ............ *H04L 5/0055* (2013.01); *H04W 16/26* (2013.01); *H04L 2001/0097* (2013.01); *H04W 28/06* (2013.01); *H04W 84/047* (2013.01); *H04W 88/08* (2013.01)

(56) References Cited

U.S. PATENT DOCUMENTS

| | | | |
|---|---|---|---|
| 2012/0093082 A1* | 4/2012 | Kim et al. | 370/328 |
| 2013/0242814 A1* | 9/2013 | Wang et al. | 370/280 |
| 2013/0322357 A1* | 12/2013 | He et al. | 370/329 |
| 2014/0003326 A1* | 1/2014 | Nishio et al. | 370/315 |
| 2014/0185576 A1* | 7/2014 | Lei et al. | 370/329 |

OTHER PUBLICATIONS

Ericsson, ST Ericsson, "PUCCH feedback on Un for TDD", 3GPP TSG-RAN WG1 #64, Tdoc R1-110646, Jan. 2011.

Catt, "Way forward on TDD UL ACK/NAK on Un PUCCH in Rel-10", TSG-RAN WG1 Meeting #64, R1-111200, Feb. 2011.

"Evolved Universal Terrestrial Radio Access (E-UTRA); Physical layer for relaying operation (Release 10)", 3GPP TS 36.216 V10.2.0, Mar. 2011.

"Evolved Universal Terrestrial Radio Access (E-UTRA); Physical layer measurements (Release 10)", 3GPP TS 36.214 V10.1.0, Mar. 2011.

"Evolved Universal Terrestrial Radio Access (E-UTRA); Multiplexing and channel coding (Release 10)", 3GPP TS 36.212 V10.1.0, Mar. 2011.

"Evolved Universal Terrestrial Radio Access (E-UTRA); Physical layer procedures (Release 10)", 3GPP TS 36.213 V10.1.0, Mar. 2011.

"Evolved Universal Terrestrial Radio Access (E-UTRA); Physical Channels and Modulation (Release 10)", 3GPP TS 36.211 v10.1.0, Mar. 2011.

International Search Report for Application No. PCT/JP2012/002565 dated Jun. 26, 2012.

* cited by examiner

| NUMBER OF Scell BHSFS (M) OF A/N TRANSMISSION TARGET | TRANSMISSION METHOD |
|---|---|
| 0 | BPSK / QPSK |
| 1~(K-1) | Bundling + Channel Selection |
| K~ | Block Coding |

FIG. 9

INCREASE BASE STATION COVERAGE THROUGH EFFICIENT RELAY STATION BACKHAUL COMMUNICATION USING CARRIER AGGREGATION

TECHNICAL FIELD

The present invention relates to a relay station, a base station, a transmission method and a reception method.

BACKGROUND ART

In recent years, it has become common to transmit large-volume data, such as still image data and moving image data in addition to audio data in cellular mobile communication systems, in response to spread of multimedia information. Active studies associated with techniques for achieving a high transmission rate in a high-frequency radio band have been conducted to achieve large-volume data transmission.

When a high frequency radio band is utilized, however, attenuation increases as the transmission distance increases, although a higher transmission rate can be expected within a short range. Accordingly, the coverage area of a base station (which may also be referred to as "eNB") decreases when a mobile communication system using a high frequency radio band is actually put into operation. Thus, more base stations need to be installed in this case. The installation of base stations involves reasonable costs, however. For this reason, there has been a high demand for a technique that provides a communication service using a high-frequency radio band, while limiting an increase in the number of base stations.

In order to meet such a demand, studies have been carried out on a relay technique in which a relay station (or which may also be called "relay node (RN)") is installed between a base station and a terminal (which may also be called "user equipment (UE)") to perform communication between the base station and mobile station via the relay station for the purpose of increasing the coverage area of each base station. The use of relay technique allows a terminal not capable of directly communicating with a base station to communicate with the base station via a relay station.

An LTE-A (long-term evolution advanced, corresponding to 3GPP Release 10) system for which the introduction of the relay technique described above has been studied is required to maintain compatibility with LTE (long term evolution, corresponding to 3GPP Release 8) in terms of a smooth transition from and coexistence with LTE. For this reason, mutual compatibility with LTE is required for the relay technique as well.

Furthermore, in an LTE-A system using a relay station (e.g., see Non-Patent Literature (hereinafter, referred to as "NPL" 1)), the relay station is required to also cover an LTE terminal. Studies are being conducted on the LTE-A system that carries out communication between a base station and a relay station (backhaul communication) and communication between the relay station and a terminal (access link) using the same frequency band. In this case, for a downlink (DL) frequency, a downlink backhaul subframe (DL BHSF) is configured as a subframe used for communication between the base station and the relay station (backhaul communication). The relay station receives a signal from the base station in a DL BHSF on the downlink and transmits a signal directed to a terminal served by the relay station (a terminal within the cell of the relay station) in subframes other than the DL BHSF. On the other hand, on the uplink (UL), an uplink backhaul subframe (UL BHSF) is configured at the fourth subframe from the DL BHSF as a subframe used for communication between the base station and the relay station (backhaul communication). On the uplink, the relay station transmits a signal directed to the base station in the UL BHSF and receives a signal from a terminal served by the relay station in a subframe other than the UL BHSF. Thus, backhaul communication (communication between the base station and the relay station) and access link communication of the relay station (communication between the relay station and the terminal) are divided in the time domain (e.g., see NPL 1).

Furthermore, in LTE, studies are being carried out on configuring a terminal served by the relay station on the downlink with an MBMS single frequency network (MBSFN) subframe. The MBSFN subframe is a subframe defined to transmit data of a multimedia broadcast multicast service (MBMS service). The terminals are configured not to receive any signal unless an MBMS service is indicated in the MBSFN subframe. Furthermore, as described above, in a BHSF (DL BHSF and UL BHSF) in which the relay station communicates with the base station, the relay station does not perform communication with terminals served by the relay station. Thus, for the LTE system, a technique is proposed that configures the MBSFN subframe with an access link subframe that overlaps with the BHSF (DL BHSF and UL BHSF) in which the relay station communicates with the base station. Such a configuration can avoid deterioration of quality measurement accuracy caused by terminals erroneously detecting signals not actually transmitted (including a common reference signal (CRS: common pilot signal)).

FIG. 1 illustrates a subframe configuration example in backhaul communication between a base station (eNB) and a relay station (RN) (communication in an eNB cell), and communication between the relay station (RN) and a terminal (UE) (communication in an RN cell).

For example, attention is focused on a leading frame shown in FIG. 1. In the downlink in the eNB cell shown in FIG. 1, subframes 1 and 3 are configured as DL BHSFs. Furthermore, on the uplink in the eNB cell shown in FIG. 1, subframes 5 and 7, the fourth subframes respectively from the subframes 1 and 3 in which the DL BHSFs are configured, configured as UL BHSFs. On the other hand, on the downlink of the RN cell shown in FIG. 1, subframes 1 and 3 configured as DL BHSFs in the eNB cell and subframes 5 and 7 configured as UL BHSFs on the uplink are configured as MBSFN subframes, respectively. The same applies to other frames shown in FIG. 1. Note that in FIG. 1, for example, DL BHSFs are configured in subframes other than subframes that cannot be configured as BHSFs (e.g., subframes to which broadcast information or the like is assigned) among subframes provided at 8-subframe intervals.

Furthermore, in the LTE-A system (e.g., see NPLs 2 to 5), a band for the LTE-A system is divided into "component carriers (component bands)" corresponding to support bandwidths of the LTE system in order to simultaneously achieve communication at an ultra-high transmission rate, as high as several times transmission rates in the LTE system, and compatibility with the LTE system. For example, the "component carrier" is a band having a maximum width of 20 MHz and is defined as a base unit (fundamental frequency band) of a communication band. Furthermore, the "component carrier" may also be denoted as "cell." Furthermore, the "component carrier" may also be abbreviated as "CC(s)." The LTE-A system supports so-called carrier aggregation which is communication using a band with some "component carriers" thereof bundled together. In carrier aggregation, a data signal is transmitted in each CC to thereby improve the data transmission rate.

The above-described "component carrier" configured for one terminal includes one primary component carrier (or primary cell: PCell), one or a plurality of secondary component carriers (or secondary cell: SCell). For example, in a subframe in which there is no data signal to transmit by an uplink, control information such as an ACK/NACK signal for downlink data (response signal, hereinafter described as "A/N signal") and channel quality information (channel quality indicator: CQI) are transmitted only from a PCell. More specifically, the above-described control information is transmitted using an uplink control channel (e.g., PUCCH (physical uplink control channel)) in the PCell. This is because when signals are simultaneously transmitted using different CCs on the uplink, the coverage decreases as PAPR (peak to average power ratio) increases. When downlink data is received with both the PCell and SCell in a certain subframe, the terminal transmits an A/N signal for the downlink data received in each CC in the fourth subframe from the certain subframe, using the PCell. That is, the LTE-A system (3GPP Release 10) transmits an A/N signal in the fourth subframe from the subframe in which PDSCH (physical downlink shared channel) is assigned, only from the PCell.

Furthermore, in the LTE-A system to which the aforementioned carrier aggregation is applied, the terminal may receive a plurality of downlink data items on a plurality of CCs at a time. In the LTE-A system, channel selection (also referred to as "multiplexing"), bundling, and block coding using PUCCH format 3 are under study as methods for transmitting a plurality of A/N signals for the plurality of downlink data items.

Channel selection changes not only symbol points used for A/N signals but also resources to which the A/N signals are mapped in accordance with a pattern of error detection results relating to the plurality of downlink data items. Bundling bundles ACKs or NACKs generated from error detection results relating to the plurality of downlink data items (that is, logical AND of the error detection results relating to the plurality of downlink data items is calculated assuming ACK=1 and NACK=0), and transmits an A/N signal (which may also be referred to as "bundled A/N signal") using one predetermined resource. Furthermore, according to the method for performing block coding using PUCCH format 3, the terminal collectively encodes a plurality of response signals for the plurality of respective downlink data items in blocks and transmits the coded data using a channel called "PUCCH format 3."

For example, in the LTE-A system, when the number of A/N bits is four or less, A/N signals are transmitted from PUCCH of a PCell using channel selection, and when the number of A/N bits is five or more, A/N signals are transmitted on PUCCH of a PCell using PUCCH format 3.

In the LTE-A system, in a subframe in which there is a data signal to transmit on an uplink, the above-described control information is time-multiplexed with the data signal through an uplink data channel (e.g., PUSCH (physical uplink shared channel)) and transmitted. That is, when PUSCH exists in a PCell, control information is transmitted through PUSCH of the PCell and when PUSCH exists in an SCell, control information is transmitted through PUSCH of the SCell.

In 3GPP Release 11 that further expands the LTE-A system, application of carrier aggregation to communication between a base station (eNB) and a relay station (RN) (backhaul communication) is also under study (e.g., see NPL 6).

CITATION LIST

Non-Patent Literature

NPL 1
3GPP TS 36.216 V10.2.0, "Physical layer for relaying operation (Release 10)," March 2011
NPL 2
3GPP TS 36.211 V10.1.0, "Physical Channels and Modulation (Release 10)," March 2011
NPL 3
3GPP TS 36.212 V10.1.0, "Multiplexing and channel coding (Release 10)," March 2011
NPL 4
3GPP TS 36.213 V10.1.0, "Physical layer procedures (Release 10)," March 2011
NPL 5
3GPP TS 36.214 V10.1.0, "Physical layer Measurements (Release 10)," March 2011
NPL 6
NTT DoCoMo, 3GPP RAN1 meeting, R1-110243, "Combination of carrier Aggregation and Relay in Rel-10," January 2011

SUMMARY OF INVENTION

Technical Problem

When carrier aggregation is performed between a base station and a relay station, a method for transmitting an A/N signal in carrier aggregation according to aforementioned 3GPP Release 10 (that is, a method whereby the A/N signal is transmitted in the fourth subframe from a subframe to which PDSCH is assigned only from a PCell) may be applied. As described above, a UL BHSF of the PCell to transmit an A/N signal or the like is configured at the fourth subframe from a DL BHSF of the PCell. Therefore, the base station needs to configure a DL BHSF of the SCell at the subframe located four subframes before the UL BHSF configured in the PCell in order to transmit an A/N signal for downlink data received by the SCell. That is, subframes in which DL BHSFs are configured need to be the same for the PCell and SCell.

For example, FIG. 2 illustrates a configuration example of BHSFs in a PCell and SCell between a base station (eNB) and a relay station (RN). Although not shown in FIG. 2, each CC is configured with a cell of the relay station (RN cell) as shown in FIG. 1.

As shown in FIG. 2, DL BHSFs in the SCell are configured at the subframe located four subframes before UL BHSFs in the PCell, that is, only at the same timing as that of DL BHSFs in the PCell. Thus, when carrier aggregation is configured in the backhaul between the base station and the relay station, applying the above-described A/N signal transmission method involves a constraint that DL BHSFs in the SCell cannot be configured in subframes other than DL BHSFs of the PCell.

Furthermore, in the operation of the relay station, a balance between radio resources used for the backhaul and radio resources used for the access link needs to be taken into consideration to maximize the system throughput. Furthermore, radio resources used for the backhaul are also used as radio resources for terminals in the cell of the base station (macro cell). For this reason, radio resources used for the backhaul need to be configured by also taking into account the throughput of the terminals in the cell of the base station.

For example, when a channel condition of the backhaul (between the base station and the relay station) is good or when the number of terminals served by the relay station (cell of the relay station) is large, radio resources are configured such that the number of radio resources of the backhaul decreases and the number of radio resources of the access link (between the relay station and the terminals) increases. On the other hand, when the channel condition of the backhaul is poor or when the number of terminals served by the relay station is small, radio resources are configured such that the number of radio resources of the backhaul increases and the number of radio resources of the access link decreases.

However, according to the above-described A/N signal transmission method, BHSFs need to be added or deleted in both the PCell and SCell to change radio resources used for the backhaul, that is, to change BHSF configuration. A change in BHSF configuration involves not only a change in the configuration of a radio resource control parameter (e.g., RRC (radio resource control) (RRC reconfiguration)) to the relay station but also a change in a configuration relating to the relationship between the relay station and the terminal (RN cell) such as a change in the configuration of MBSFN subframes, and therefore the delay in data transmission increases. For example, such a configuration change may result in a delay on the order of several hundreds of ms. Thus, a change in the BHSF configuration in both the PCell and SCell may result in a delay unacceptable to data with stringent delay requirements.

On the other hand, UL BHSFs of the PCell may be additionally configured for A/N signals for downlink data transmitted in the SCell. This configuration allows DL BHSFs of the SCell to be individually configured irrespective of whether or not DL BHSFs of the PCell are configured at the subframe located four subframes before the additionally configured UL BHSF of the PCell.

Here, when no DL BHSF is configured in the PCell in the downlink subframe located four subframes before the UL BHSFs of the PCell additionally configured for the SCell, the subframes of the PCell can be configured as subframes for other terminals served by the relay station. However, since the additionally configured UL BHSFs are used for transmission (that is, backhaul communication) of A/N signals of the SCell, the relay station does not receive A/N signals from terminals served by the relay station in the additionally configured UL BHSFs. As a result, in the PCell, the base station cannot assign downlink data for the terminals at the subframe located four subframes before the additionally configured UL BHSFs of the PCell. For this reason, when UL BHSFs of the PCell are additionally configured for A/N signals for downlink data transmitted in the SCell, radio resources usable for communication between the relay station and the terminal may be wasted.

An object of the present invention is to provide a relay station, a base station, a transmission method, and a reception method each making it possible to individually configure BHSFs of an SCell without wasting radio resources and without changing BHSFs of the PCell when carrier aggregation is performed between a base station and a relay station.

Solution to Problem

A relay station according to an aspect of the present invention is a relay station used in a communication system configured to use a first component carrier and a second component carrier for backhaul communication between a base station and the relay station and to configure a first subframe of the first component carrier used for backhaul communication in downlink and a second subframe of the first component carrier used for backhaul communication in uplink, the second subframe being a subframe located after a predetermined number of subframes from the first subframe, the relay station including: a generating section that generates a response signal for a downlink signal received from the base station in each of the first component carrier and the second component carrier; and a transmitting section that transmits the response signal using the first component carrier, in which the transmitting section transmits, in the second subframe of the first component carrier, a response signal for a downlink signal received using the second component carrier in a subframe different from the first subframe of the first component carrier.

A base station according to an aspect of the present invention is a base station used in a communication system configured to use a first component carrier and a second component carrier for backhaul communication between the base station and a relay station and to configure a first subframe of the first component carrier used for backhaul communication in downlink and a second subframe of the first component carrier used for backhaul communication in uplink, the second subframe being a subframe located after a predetermined number of subframes from the first subframe, the base station including: an assignment section that assigns a downlink signal for the relay station to each of the first component carrier and the second component carrier; and a receiving section that receives a response signal for the downlink signal using the first component carrier, in which the receiving section receives, in the second subframe of the first component carrier, a response signal for a downlink signal transmitted using the second component carrier in a subframe different from the first subframe of the first component carrier.

A transmission method according to an aspect of the present invention is a transmission method used in a communication system configured to use a first component carrier and a second component carrier for backhaul communication between a base station and a relay station and to configure a first subframe of the first component carrier used for backhaul communication in downlink and a second subframe of the first component carrier used for backhaul communication in uplink, the second subframe being a subframe located after a predetermined number of subframes from the first subframe, the transmission method including: generating a response signal for a downlink signal received from the base station using each of the first component carrier and the second component carrier; and transmitting, in the second subframe of the first component carrier, a response signal for a downlink signal received using the second component carrier in a subframe different from the first subframe of the first component carrier.

A reception method according to an aspect of the present invention is a reception method used in a communication system configured to use a first component carrier and a second component carrier for backhaul communication between a base station and a relay station and to configure a first subframe of the first component carrier used for backhaul communication in downlink and a second subframe of the first component carrier used for backhaul communication in uplink, the second subframe being a subframe located after a predetermined number of subframes from the first subframe, the reception method including: assigning a downlink signal for the relay station to each of the first component carrier and the second component carrier; and receiving, in the second subframe of the first component carrier, a response signal for a downlink signal transmitted using the second component carrier in a subframe different from the first subframe of the first component carrier.

Advantageous Effects of Invention

According to the present invention, when carrier aggregation is performed between a base station and a relay station, it is possible to individually configure BHSFs of an SCell without wasting radio resources and without changing BHSFs of the PCell.

BRIEF DESCRIPTION OF DRAWINGS

FIG. 9 illustrates an example of correspondence between the number of BHSFs of an SCell as an A/N signal transmission target and a transmission method according to Embodiment 2 of the present invention.

DESCRIPTION OF EMBODIMENTS

Figure 1:
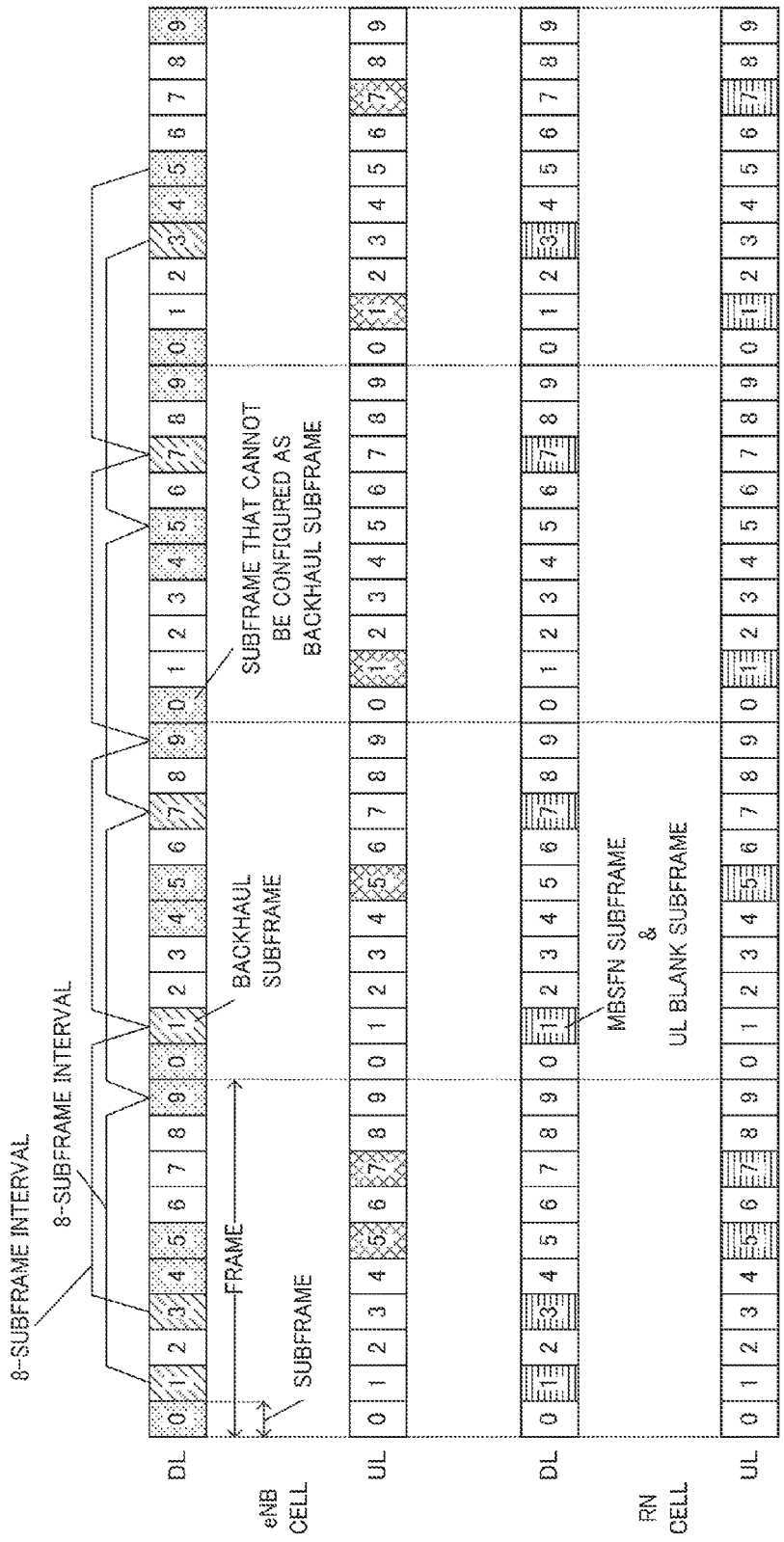
FIG. 1 illustrates a configuration example of BHSFs.

Hereinafter, embodiments of the present invention will be described in detail with reference to the accompanying drawings. In the embodiments, the same elements will be assigned the same reference numerals, and any duplicate description of the elements is omitted.

[Embodiment 1]

[Overview of Communication System]

The communication system according to Embodiment 1 of the present invention includes base station 100, relay station 200 and a terminal. This communication system is, for example, an LTE-A system. Base station 100 is an LTE-A base station and communicates with relay station 200 through a backhaul.

Furthermore, this communication system applies carrier aggregation to communication (backhaul communication) between base station 100 and relay station 200. That is, a plurality of CCs including a PCell and SCells are used for backhaul communication between base station 100 and relay station 200.

Furthermore, in this communication system, DL BHSFs of a PCell used for backhaul communication in downlink (DL), UL BHSFs of a PCell used for backhaul communication in uplink (UL) and DL BHSFs of an SCell used for backhaul communication in downlink (DL) are configured. Here, a UL BHSF of a PCell is assumed to be a subframe located after a predetermined number of subframes (here, fourth subframe) from a DL BHSF of the PCell.

Furthermore, relay station 200 applies channel selection to an A/N signal for downlink data (PDSCH) received in the PCell and an A/N signal for downlink data (PDSCH) received in the SCell and transmits the A/N signals in the PCell. Furthermore, relay station 200 may bundle, into one, a plurality of A/N signals for a plurality of downlink data items received in the SCell (bundling). In this case, relay station 200 applies channel selection to the A/N signals bundled into one (bundled A/N signal) and an A/N signal for downlink data (PDSCH) received in the PCell and transmits the A/N signals in the PCell.

Figure 3:
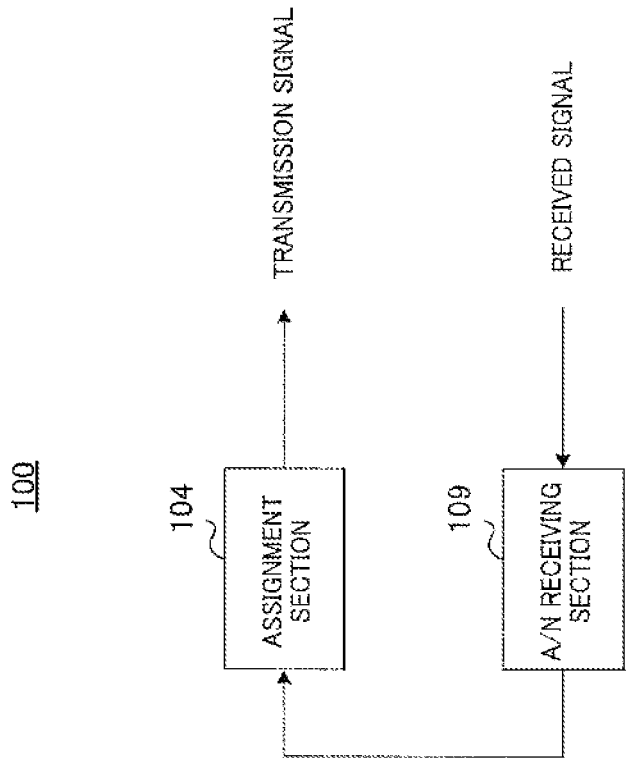
FIG. 3 illustrates a main configuration diagram of a base station according to Embodiment 1 of the present invention.

FIG. 3 is a main configuration diagram of base station 100 according to the present embodiment. In base station 100, assignment section 104 assigns a downlink signal to each of a PCell (first component carrier) and an SCell (second component carrier), and A/N receiving section 109 receives an A/N signal (response signal) for the downlink signal in the PCell (first component carrier). Here, A/N receiving section 109 receives, in a UL BHSF (second subframe) of the PCell (first component carrier), an A/N signal (response signal) for a downlink signal transmitted using the SCell (second component carrier) in a subframe different from the DL BHSF (first subframe) of the PCell (first component carrier).

Figure 4:
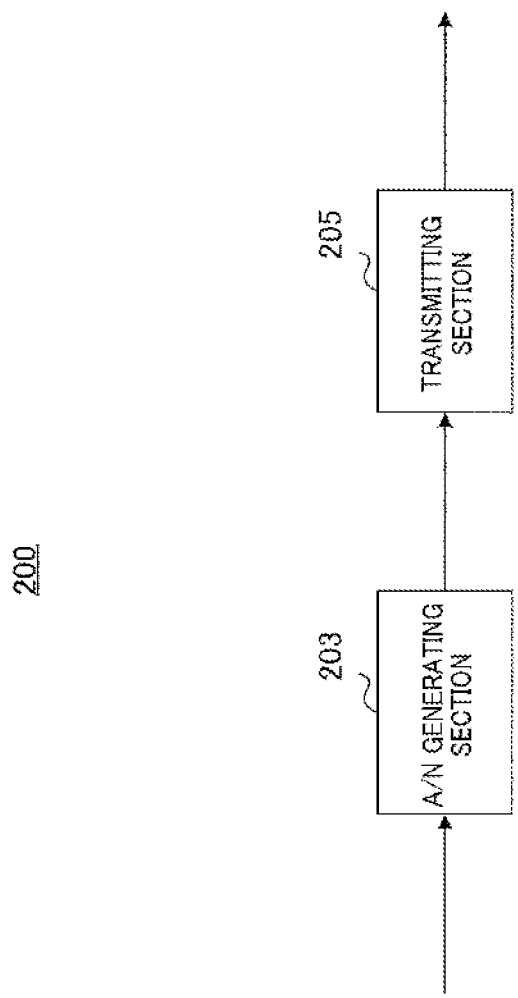
FIG. 4 illustrates a main configuration diagram of a relay station according to Embodiment 1 of the present invention.

FIG. 4 is a main configuration diagram of relay station 200 according to the present embodiment. In relay station 200, A/N generating section 203 generates A/N signals (response signals) for downlink signals respectively received in the PCell (first component carrier) and the SCell (second component carrier) from base station 100, and transmitting section 205 transmits the A/N signals (response signals) in the PCell (first component carrier). Here, transmitting section 205 transmits, in a UL BHSF (second subframe) of the PCell (first component carrier), an A/N signal (response signal) for a downlink signal received using the SCell (second component carrier) in a subframe different from a DL BHSF (first subframe) in the PCell (first component carrier).

[Configuration of Base Station 100]

Figure 5:
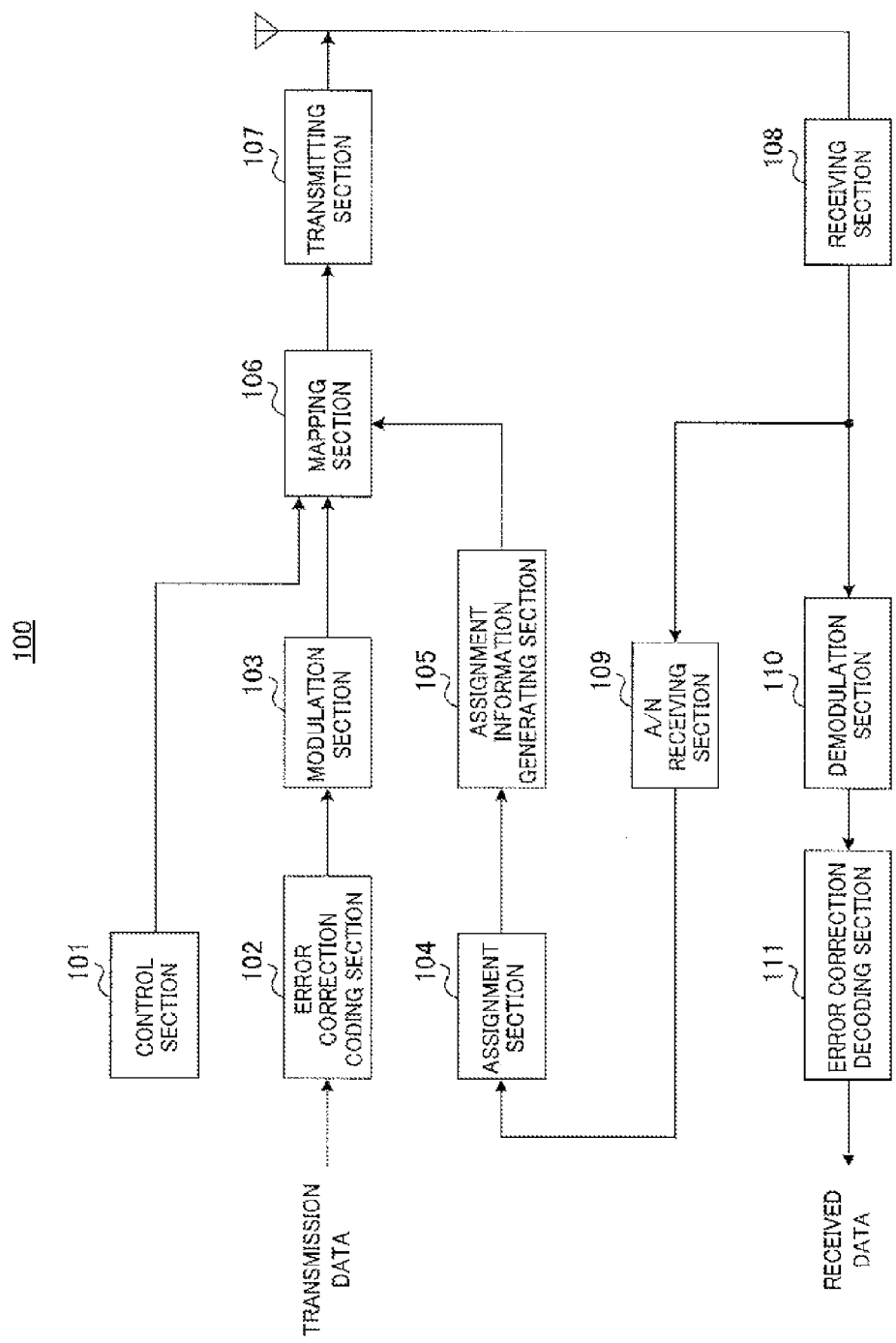
FIG. 5 is a block diagram illustrating a configuration of the base station according to Embodiment 1 of the present invention.

FIG. 5 is a block diagram illustrating a configuration of base station 100 according to the present embodiment. In FIG. 5, base station 100 includes control section 101, error correction coding section 102, modulation section 103, assignment section 104, assignment information generating section 105, mapping section 106, transmitting section 107, receiving section 108, A/N receiving section 109, demodulation section 110, and error correction decoding section 111.

Control section 101 configures BHSFs (DL BHSFs and UL BHSFs) for each relay station 200 based on a channel condition between base station 100 and a plurality of relay stations 200 or the number of terminals served by each relay station 200. Examples of the channel condition between base station 100 and relay station 200 include path loss, fading, receiving power, reception SIR (signal to interference ratio), and moving speed. For example, assuming that one frame consists of 10 subframes and one subframe=1 ms, control section 101 configures DL BHSFs repeating in cycles of 40 ms (=4 frames=40 subframes). Furthermore, control section 101 configures a subframe located after a predetermined number of subframes from a DL BHSF, as a UL BHSF. For example, control section 101 configures the fourth subframe from a DL BHSF as a UL BHSF.

Furthermore, control section 101 configures each relay station 200 with carrier aggregation. That is, control section 101 configures each relay station 200 with a plurality of frequency bands called "cells" or "component carriers (CCs)." Furthermore, control section 101 configures one of the plurality of CCs configured for each relay station 200 as a PCell and configures cells other than the PCell as SCells. Furthermore, control section 101 configures radio parameters for the PCell and SCells configured for each relay station 200.

Control section 101 outputs control information including BHSF information indicating the configured BHSFs, CA information on the configured carrier aggregation and radio parameters of each CC or the like to mapping section 106.

Error correction coding section 102 receives transmission data as input, performs error correction coding (turbo coding or the like) on the inputted transmission data and outputs the coded transmission data to modulation section 103.

Modulation section 103 applies modulation processing (QPSK or 16QAM or the like) to the transmission data received from error correction coding section 102 and outputs the modulated transmission data to mapping section 106.

Assignment section 104 performs processing of allocating radio resources (time resources, frequency resources or spatial resources) to data (PDSCH) for each relay station 200. For example, assignment section 104 determines to which of a PCell or SCell of each relay station 200 configured in control section 101 data are to be assigned based on channel quality information (CQI) of each CC reported from each relay station 200 or a delay requirement of each transmission data item. For example, assignment section 104 assigns data having a stringent delay requirement to the PCell and assigns data having a moderate delay requirement to the SCell. Next, assignment section 104 performs scheduling on the PCell or SCell for which data assignment has been determined and assigns the respective data items to the radio resources. Furthermore, assignment section 104 assigns retransmission data (not shown) to the radio resources based on an A/N determination result (ACK or NACK) inputted from A/N receiving section 109. Assignment section 104 outputs the radio resource allocation result for data directed to each relay station 200 to assignment information generating section 105.

Assignment information generating section 105 generates assignment information (e.g., downlink control information: DCI) including the assignment result in assignment section 104. Here, assignment information generating section 105 includes DAI (downlink assignment information) indicating the number of PDSCHs (the number of assigned PDSCHs or PDSCHs to be assigned) assigned to data corresponding to a plurality of A/N signals bundled into one UL BHSF in the PCell and transmitted as a bundled A/N signal in the assignment information on the data (PDSCH) to be transmitted in the SCell. Assignment information generating section 105 performs error correction coding processing and modulation processing on the generated assignment information and outputs the modulated assignment information to mapping section 106.

Mapping section 106 maps the transmission data (that is, PDSCH) inputted from modulation section 103 to the radio resources based on the assignment information (assignment result in each CC of each relay station 200) inputted from assignment information generating section 105. Furthermore, mapping section 106 maps the control information inputted from control section 101 and the assignment information inputted from assignment information generating section 105 to the radio resources. The signal mapped to each radio resource is outputted to transmitting section 107.

Transmitting section 107 applies radio transmission processing such as up-conversion to the signal inputted from mapping section 106 and transmits the signal via an antenna.

Receiving section 108 receives a signal transmitted from relay station 200 via the antenna, applies radio processing such as down-conversion and outputs the processed signal to A/N receiving section 109 and demodulation section 110.

A/N receiving section 109 extracts a signal corresponding to a resource whereby an A/N signal is to be transmitted (A/N resource) from the signal inputted from receiving section 108.

When the signal inputted from receiving section 108 contains uplink data (PUSCH), the A/N resource is a resource corresponding to PUSCH. On the other hand, when the signal inputted from receiving section 108 does not contain uplink data (PUSCH), the A/N resource is a resource corresponding to PUCCH arranged in a UL BHSF in a PCell. Furthermore, regarding the relationship between the PCell and SCell, A/N receiving section 109 determines by which A/N resource used for channel selection and at which constellation the signal is transmitted and thereby makes an A/N determination. Since the A/N signal of the SCell is a result of bundling A/N signals for one or a plurality of downlink data items, A/N receiving section 109 applies the A/N determination result of the SCell as A/N signals for all PDSCHs to be bundled in the SCell. A/N receiving section 109 outputs the A/N determination result (ACK or NACK) to assignment section 104.

Demodulation section 110 applies demodulation processing on the signal inputted from receiving section 108 and outputs the signal obtained to error correction decoding section 111.

Error correction decoding section 111 decodes the signal inputted from demodulation section 110 and obtains received data. The received data obtained is outputted to a subsequent functional section (not shown).

[Configuration of Terminal 200]

Figure 6:
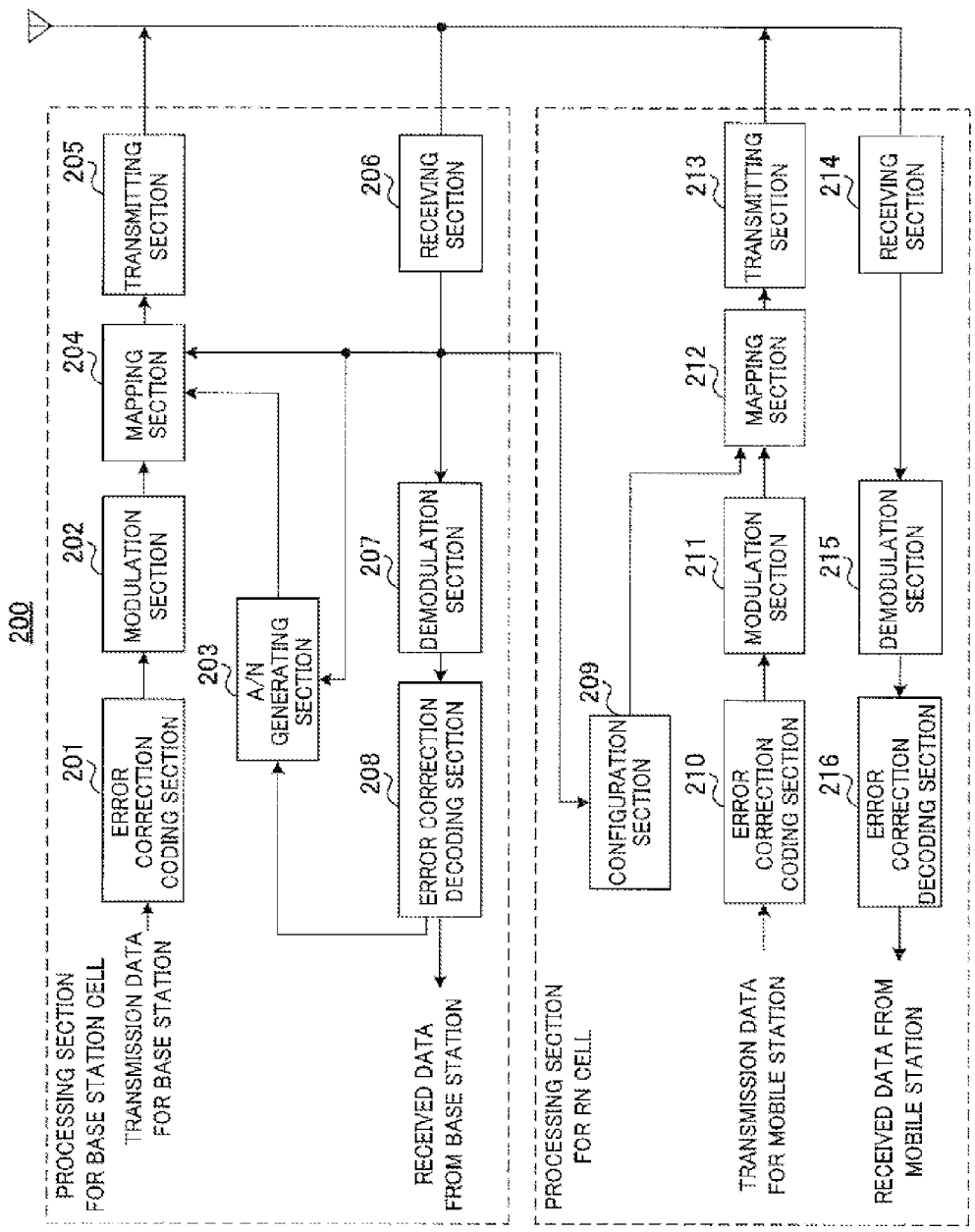
FIG. 6 is a block diagram illustrating a configuration of the relay station according to Embodiment 1 of the present invention.

FIG. 6 is a block diagram illustrating a configuration of relay station 200 according to the present embodiment. In FIG. 6, relay station 200 includes error correction coding section 201, modulation section 202, A/N generating section 203, mapping section 204, transmitting section 205, receiving section 206, demodulation section 207, error correction decoding section 208, configuration section 209, error correction coding section 210, modulation section 211, mapping section 212, transmitting section 213, receiving section 214, demodulation section 215, and error correction decoding section 216. Error correction coding section 201 to error correction decoding section 208 in FIG. 6 constitute a transmission/reception processing section for the cell of base station 100 (for communication between base station 100 and relay station 200). On the other hand, configuration section 209 to error correction decoding section 216 in FIG. 6 constitute a transmission/reception processing section for the cell of relay station 200 (for communication between relay station 200 and terminals served by relay station 200).

Error correction coding section 201 receives transmission data (uplink data) directed to base station 100 as input, performs error correction coding (turbo coding or the like) on the inputted transmission data and outputs the coded transmission data to modulation section 202.

Modulation section 202 applies modulation processing (QPSK or 16QAM or the like) to the transmission data received from error correction coding section 201 and outputs the modulated transmission data to mapping section 204.

A/N generating section 203 performs error detection processing on a signal inputted from error correction decoding section 208, that is, downlink data (PDSCH) received from base station 100 in each CC (PCell and SCell) and generates an A/N signal. Furthermore, of A/N signals for downlink data received in the SCell, A/N generating section 203 bundles A/N signals to be collectively transmitted in one UL BHSF of the PCell. To be more specific, A/N generating section 203 bundles A/N signals for downlink data (PDSCH) received from base station 100 in the SCell during a period between the subframe located four subframes before the UL BHSF to be transmitted this time (transmission target subframe) among a plurality of UL BHSFs configured in the PCell and a subframe located after the subframe located four subframes before the UL BHSF to be transmitted immediately before the transmission target this time (that is, subframe located three subframes before the UL BHSF which is the immediately preceding transmission target).

For example, A/N generating section 203 determines the number of A/N signals to be bundled from the number of PDSCHs assigned in the SCell indicated by DAI included in assignment information inputted from receiving section 206. When, for example, the number of PDSCHs assigned in the SCell indicated by DAI is different from the number of PDSCHs actually received in the SCell, A/N generating section 203 generates a NACK for a subframe in which a PDSCH has been assigned but has not been received (that is, a subframe that has been erroneously recognized as having no PDSCH assignment due to a DCI decoding error). It is thereby possible to prevent erroneous processing such as generating an ACK in a subframe that has been erroneously recognized as having PDSCH assignment due to an error in receiving PDSCH assignment information.

Bundling is processing of calculating logical AND of a plurality of A/N signals (e.g., ACK=1, NACK=0). Thus, A/N generating section 203 generates an ACK when all A/N signals to be bundled are "1" (there is no error in any PDSCHs) and generates a NACK when any one of A/N signals to be bundled is "0" (there is an error in one of PDSCHs). Furthermore, when PDSCHs are spatially multiplexed and transmitted, A/N generating section 203 may perform bundling in units of spatially-multiplexed data blocks (transport blocks).

Mapping section 204 maps the transmission data (that is, PUSCH) inputted from modulation section 202 and the A/N signals inputted from A/N generating section 203 to radio resources for transmission data and radio resources for A/N signals (A/N resources). Here, mapping section 204 assigns the transmission data to PUSCH resources (or resource blocks) indicated in assignment information (DCI) inputted from receiving section 206. Furthermore, mapping section 204 maps the transmission data to radio resources in subframes corresponding to UL BHSFs of the PCell based on the BHSF information and CA information inputted from receiving section 206. Furthermore, when a PUSCH is assigned in a UL BHSF of the PCell, mapping section 204 assigns (multiplexes) A/N signals to (with) the PUSCH and maps the A/N signals to radio resources in subframes corresponding to the UL BHSFs of the PCell. On the other hand, when no PUSCH is assigned in the UL BHSF of the PCell, mapping section 204 assigns A/N signals to the PUSCH and maps the A/N signals to radio resources in subframes corresponding to the UL BHSFs of the PCell. The signals mapped to the respective radio resources are outputted to transmitting section 205.

Transmitting section 205 applies radio transmission processing such as up-conversion to the signals inputted from mapping section 204 and transmits the processed signal via an antenna. In this way, A/N signals for downlink data (PDSCH) received from base station 100 in each CC (PCell and SCell) are transmitted in the PCell.

Receiving section 206 receives a signal transmitted from base station 100 via the antenna and applies radio processing such as down-conversion thereto. The signal transmitted from the base station contains assignment information indicating an assignment result on uplink data, BHSF information indicating BHSFs configured between base station 100 and relay station 200, CA information on carrier aggregation configured in relay station 200, A/N resource information indicating A/N resources, control information such as radio parameters of each CC, and downlink data (PDSCH) from base station 100. Receiving section 206 outputs the assignment information and BHSF information to mapping section 204 and outputs the downlink data to demodulation section 207. Furthermore, receiving section 206 outputs the assignment information to A/N generating section 203 and outputs the BHSF information to configuration section 209.

Demodulation section 207 applies demodulation processing to the signal inputted from receiving section 206 and outputs the signal obtained to error correction decoding section 208.

Error correction decoding section 208 decodes the signal inputted from demodulation section 207 and obtains received data. Error correction decoding section 208 outputs the received data obtained to A/N generating section 203 and a subsequent functional section (not shown).

On the other hand, configuration section 209 configures MBSFN subframes for the cell covered by relay station 200 (cell of relay station 200) based on the BHSF information inputted from receiving section 206. That is, configuration section 209 configures the subframes configured as DL BHSFs to be the MBSFN subframes. Here, the MBSFN subframe is a subframe mainly used for an MBMS service. For example, the MBSFN subframe consists of 14 OFDM symbols and the leading three OFDM symbols correspond to a control channel region and the remaining 11 OFDM symbols correspond to a subframe in which no signals are received by terminals except for the terminals configured to receive the MBMS service. Configuration section 209 outputs the configuration information of the MBSFN subframe to mapping section 212. The configuration information is transmitted to terminals served by relay station 200 as broadcast information.

Error correction coding section 210 receives transmission data (downlink data) directed to terminals served by relay station 200, as input, performs error correction coding (such as turbo coding) on the inputted transmission data and outputs the coded transmission data to modulation section 211.

Modulation section 211 applies modulation processing (QPSK or 16QAM or the like) to the transmission data received from error correction coding section 210 and outputs the modulated transmission data to mapping section 212.

Mapping section 212 maps control information including the configuration information inputted from configuration section 209 and the transmission data inputted from modulation section 211 to the radio resources. Mapping section 212 maps the information to a subframe other than the MBSFN subframe.

Transmitting section 213 applies radio transmission processing such as up-conversion to the signal inputted from mapping section 212 and transmits the processed signal via the antenna.

Receiving section 214 receives a signal (uplink data) transmitted from a terminal served by relay station 200 via the antenna, applies radio processing such as down-conversion and outputs the processed signal to demodulation section 215.

Demodulation section 215 applies demodulation processing to the signal inputted from receiving section 214 and outputs the signal obtained to error correction decoding section 216.

Error correction decoding section 216 decodes the signal inputted from demodulation section 215 and obtains received data. The received data obtained is outputted to a subsequent functional section (not shown).

[Operations of Base Station 100 and Terminal 200]

Operations of base station 100 and terminal 200 configured in the manner described above will be described.

Here, a description will be particularly provided regarding a case where A/N signals are transmitted in UL BHSFs in which no data signal (PUSCH) exists. That is, a description will be given of a case where A/N signals are transmitted by only PUCCH of a PCell.

Here, a description will be given of a case where two CCs (PCell and SCell) are configured for relay station 200 (FIG. 6).

In base station 100 (FIG. 5), control section 101 configures a DL BHSF independently for each of the PCell and SCell configured for relay station 200 (FIG. 6). Furthermore, in the PCell, control section 101 configures a UL BHSF at the fourth subframe from the DL BHSF configured in the PCell.

The number of BHSFs configured for relay station 200 is determined based on, for example, a channel condition between base station 100 and relay station 200 or the number of terminals served by relay station 200. For example, when the channel condition between base station 100 and relay station 200 is good, or when the number of terminals served by relay station 200 is large, control section 101 configures a smaller number of BHSFs and increases the number of access link subframes. On the other hand, when the channel condition between base station 100 and relay station 200 is poor or the number of terminals served by relay station 200 is small, control section 101 configures a larger number of BHSFs and decreases the number of access link subframes. Furthermore, when the number of terminals served by base station 100 is large, control section 101 may configure a smaller number of BHSFs and increase the number of BHSFs when the number of terminals served by base station 100 is small. Alternatively, control section 101 may also configure the number of BHSFs based on both the number of terminals served by base station 100 and the number of terminals served by relay station 200 (e.g., ratio in the number of terminals or difference in the number of terminals).

When the channel condition between base station 100 and relay station 200 or the number of terminals served by relay station 200 changes, control section 101 changes the configuration of BHSFs of the SCell (adds or deletes BHSFs) while maintaining (without changing) the configuration of BHSFs of the PCell.

Figure 7:
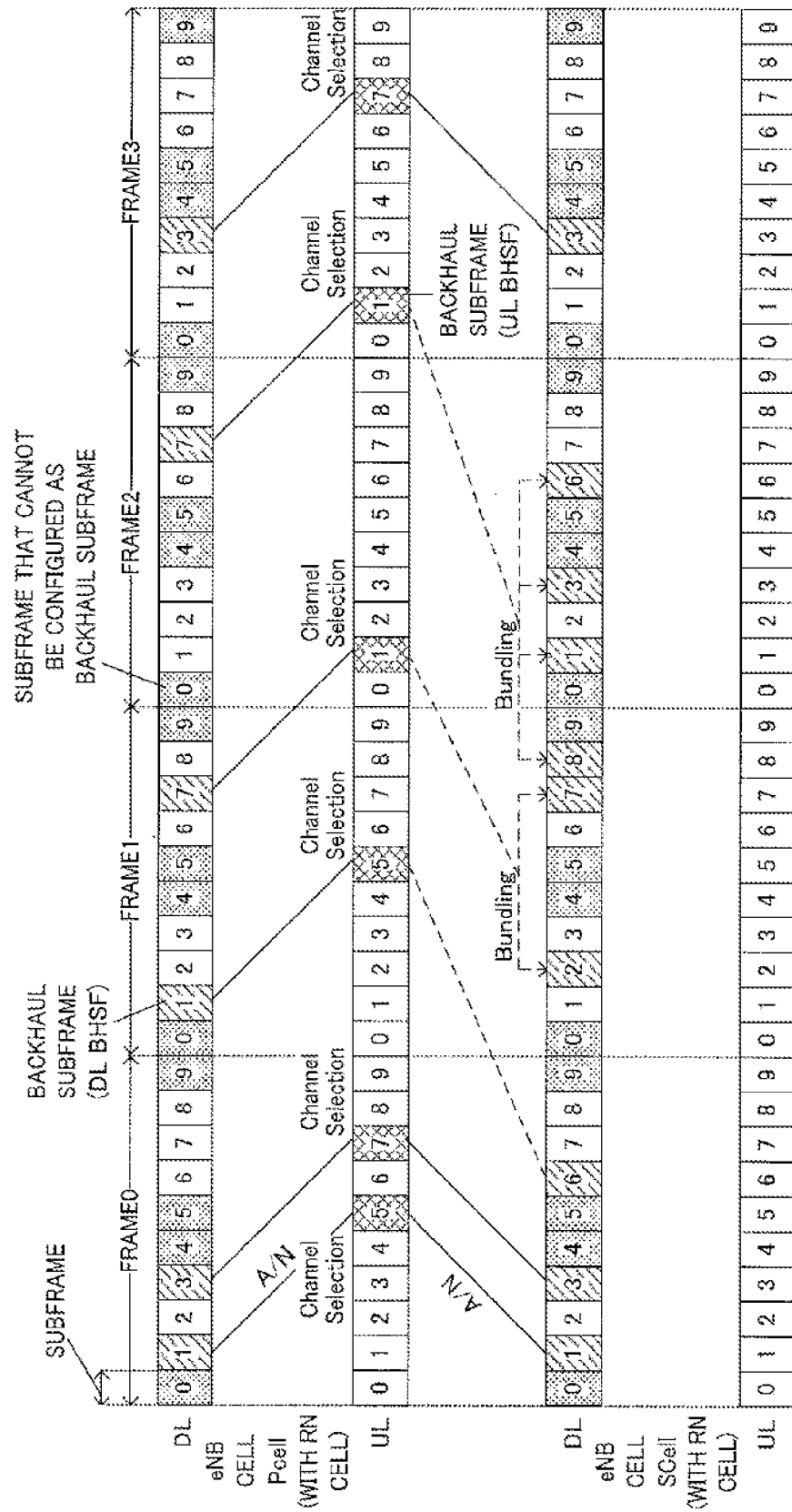
FIG. 7 illustrates a configuration example of BHSFs according to Embodiment 1 of the present invention.

For example, FIG. 7 illustrates a configuration example of BHSFs in the PCell and SCell configured for relay station 200.

As shown in FIG. 7, control section 101 configures subframes 1 and 3 of frame 0, subframes 1 and 7 of frame 1, subframe 7 of frame 2 and subframe 3 of frame 3 as DL BHSFs in the downlink (DL) of the PCell. Moreover, as shown in FIG. 7, on the PCell, control section 101 configures the fourth subframes from the DL BHSFs of the PCell as UL BHSFs.

Furthermore, as shown in FIG. 7, in the downlink of the SCell, control section 101 configures DL BHSFs independently of the PCell. For example, in FIG. 7, in the downlink (DL) of the SCell, control section 101 configures subframes 1, 3 and 6 of frame 0, subframes 2, 7 and 8 of frame 1, subframes 1, 3 and 6 of frame 2 and subframe 3 of frame 3 as DL BHSFs.

Figure 2:
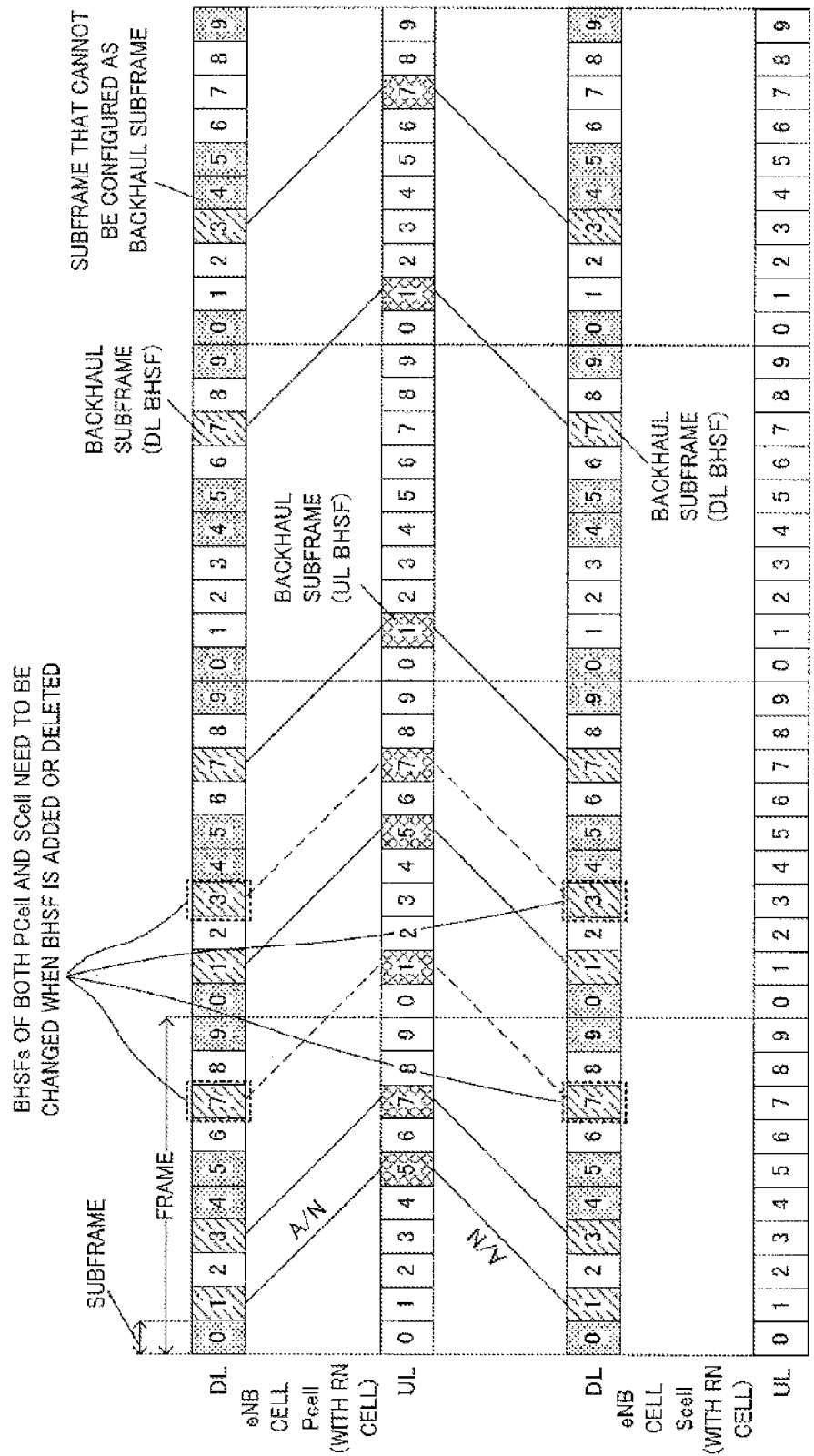
FIG. 2 illustrates another configuration example of BHSFs when carrier aggregation is applied in backhaul communication.

In comparison of FIG. 2 with FIG. 7, for example, DL BHSFs are configured only in the same subframes of the PCell and SCell in FIG. 2, whereas in FIG. 7, DL BHSFs can be configured in different subframes between the PCell and SCell.

Base station 100 transmits downlink data (PDSCH) to relay station 200 in DL BHSFs configured in the PCell and Scell shown, for example, in FIG. 7.

Furthermore, assignment information generating section 105 in base station 100 generates DAI indicating the number of data items (PUSCH) assigned (the number of PDSCHs assigned) corresponding to A/N signals to be bundled in the SCell. Here, in the SCell, the number of A/N signals to be bundled is the number of PDSCHs assigned to the SCell within a period between a subframe located four subframes before a UL BHSF in which a bundled A/N signal is transmitted and a subframe located after a subframe located four subframes before a UL BHSF configured immediately before the UL BHSF (that is, three subframes before the UL BHSF configured immediately before the UL BHSF). That is, the DAI includes information indicating the number of subframes (the number of DL BHSFs) assigned to downlink data (PUSCH) received in the SCell from base station 100 within the abovementioned period.

For example, a case will be described where a UL BHSF configured in subframe 1 of frame 2 shown in FIG. 7 is the subframe of the transmission target this time. As shown in FIG. 7, the UL BHSF configured immediately before the UL BHSF configured in subframe 1 of frame 2 is subframe 5 of frame 1. Thus, A/N signals to be bundled in the to UL BHSF configured in subframe 1 of frame 2 are A/N signals for PDSCHs assigned to the SCell during a period between a subframe located three subframes before subframe 5 of frame 1 (subframe 2 of frame 1) and a subframe located four subframes before subframe 1 of frame 2 (subframe 7 of frame 1). Thus, in FIG. 7, assignment information generating section 105 determines that the number of A/N signals to be bundled in the UL BHSF configured in subframe 1 of frame 2 is two (A/N signals for PDSCHs received in the DL BHSFs in subframes 2 and 7 of frame 1). That is, in this case, DAI indicates that two DL BHSFs are configured in the SCell.

Similarly, a case will be described where a UL BHSF configured in subframe 1 of frame 3 shown in FIG. 7 is a subframe of the transmission target this time. As shown in FIG. 7, the UL BHSF configured immediately before the UL BHSF configured in subframe 1 of frame 3 is subframe 1 of frame 2. Thus, A/N signals to be bundled in the UL BHSF configured in subframe 1 of frame 3 are A/N signals for PDSCHs assigned in the SCell during a period between a subframe located three subframes before subframe 1 of frame 2 (subframe 8 of frame 1) and a subframe located four subframes before subframe 1 of frame 3 (subframe 7 of frame 2). Thus, in FIG. 7, assignment information generating section 105 determines that the number of A/N signals to be bundled in the UL BHSF configured in subframe 1 of frame 3 is four (A/N signals for PDSCHs received in DL BHSFs in subframe 8 of frame 1, subframes 1, 3 and 6 of frame 2). That is, in this case, the DAI indicates that four DL BHSFs are configured in the SCell.

Meanwhile, relay station 200 receives signals from base station 100 in DL BHSFs configured in each of the PCell and SCell shown in FIG. 7, for example.

In relay station 200, A/N generating section 203 generates A/N signals for downlink data (PDSCH) received using the CCs. At this time, A/N generating section 203 determines A/N signals for downlink data items received respectively in the PCell and SCell first. Next, A/N generating section 203 generates a bundled A/N signal by bundling a plurality of A/N signals transmitted in UL BHSFs of the same PCell among A/N signals for downlink data received in the SCell based on the DAI indicated by base station 100.

For example, A/N generating section 203 bundles two A/N signals for downlink data received in DL BHSFs of the SCell in subframes 2 and 7 of frame 1 shown in FIG. 7 and thereby generates a bundled A/N signal to be transmitted in the UL BHSF configured in subframe of frame 2. Similarly, for example, A/N generating section 203 bundles four A/N signals corresponding to downlink data received in DL BHSFs of the SCell in subframe 8 of frame 1, subframes 1, 3 and 6 of frame 2 shown in FIG. 7 and generates a bundled A/N signal to be transmitted in a UL BHSF configured in subframe 1 of frame 3.

In the PCell, transmitting section 205 of relay station 200 then transmits the A/N signal in a UL BHSF configured at the fourth subframe from the DL BHSF used to receive a PDSCH. On the other hand, in the SCell, transmitting section 205 transmits the A/N signal in a UL BHSF of the PCell which is configured first among subframes including the fourth subframe from the DL BHSF used to receive a PDSCH and after the fourth subframe.

In this case, as shown in FIG. 7, relay station 200 performs channel selection to transmit two A/N signals including an A/N signal of the PCell and an A/N signal of the SCell (or bundled A/N signal) using one A/N resource in the PUCCH of the PCell. That is, in relay station 200, mapping section 204 maps A/N signals to A/N resources (radio resources and constellations) in accordance with the conditions of the two A/N signals (pattern of error detection result (ACK or NACK) in the PCell and SCell). Thus, transmitting section 205 transmits the A/N signal for downlink data received in the PCell and the A/N signal for downlink data received in the SCell (or the bundled signal) using channel selection.

As described above, according to the present embodiment, A/N generating section 203 in relay station 200 generates A/N signals for downlink data items respectively received in the PCell and SCell from base station 100. Furthermore, transmitting section 205 transmits A/N signals in the PCell. Here, transmitting section 205 transmits, in a UL BHSF of the PCell, an A/N signal for downlink data received using in the SCell in a subframe different from the DL BHSF of the PCell. To be more specific, relay station 200 transmits an A/N signal for downlink data received in a DL BHSF configured in the SCell, in a first subframe among UL BHSFs of the PCell configured at or after the fourth subframe from the DL BHSF configured in the SCell Furthermore, when there are a plurality of A/N signals to be transmitted in the SCell until the transmission timing of the UL BHSF of the PCell, relay station 200 bundles the plurality of A/N signals and transmits the bundled A/N signal after bundling in the SCell and the A/N signal of the PCell using channel selection.

In contrast, assignment section 104 in base station 100 assigns downlink data items directed to relay station 200 to each of the PCell and SCell. Furthermore, A/N receiving section 109 receives an A/N signal for downlink data in the PCell. At this time, A/N receiving section 109 receives, in a UL BHSF of the PCell, an A/N signal for downlink data transmitted using the SCell in a subframe different from the DL BHSF of the PCell. To be more specific, A/N receiving section 109 of base station 100 determines the conditions (ACK or NACK) of the PCell and SCell based on the A/N resources (radio resources and signal points) in which A/N signals are detected.

In the manner described above, base station 100 can configure BHSFs for relay station 200 at different timings between the PCell and SCell.

In order to improve the system throughput, even when BHSFs are changed (added or deleted) according to a change in the channel condition between base station 100 and relay station 200 or the number of terminals served by relay station 200 or the number of terminals served by base station 100, base station 100 can change only the configuration of BHSFs of the SCell while maintaining the configuration of BHSFs of the PCell.

Accordingly, base station 100 can change the configuration of only the SCell without changing the configuration of BHSFs of the PCell. Stated differently, it is possible to change the resource ratio between the backhaul and the access link while avoiding delays caused by the change of BHSFs of both the PCell and SCell. Furthermore, since base station 100 changes only the configuration of BHSFs of the SCell, no delay due to a change of the configuration of BHSFs in the PCell is produced. Furthermore, the transmission timing of an A/N signal for a PDSCH of the SCell may be later than four subframes after receiving the PDSCH. However, the transmission timing of fourth subframes from the DL BHSF can be maintained as the transmitting timing of an A/N signal in the PCell. This configuration allows base station 100 and relay station 200 to perform transmission (low delay transmission) that satisfies quality requirements such as delay requirement.

Furthermore, relay station 200 bundles a plurality of A/N signals to be transmitted in the same UL BHSF of the PCell among A/N signals for downlink data received in the SCell. Relay station 200 then transmits the A/N signals for downlink data received in the PCell and the bundled A/N signal using channel selection.

As a result, base station 100 can individually determine the error detection result of the PCell and the error detection result of the SCell. That is, even when an error is detected in a PDSCH transmitted in the SCell, base station 100 can determine whether or not a PDSCH transmitted in the PCell has been normally decoded. That is, detection of an error in a PDSCH of the SCell does not cause base station 100 to determine to retransmit not only the PDSCH of the SCell but also a PDSCH of the PCell. This configuration reduces a delay in the PCell.

Here, data (PDSCH) transmitted from base station 100 to relay station 200 also contains data directed to a plurality of terminals served by relay station 200. Thus, the data (PDSCH) transmitted from base station 100 to relay station 200 may include a mixture of data having various delay requirements (QoS) such as data having a stringent delay requirement and data having a moderate delay requirement.

Therefore, base station 100 (assignment section 104) may assign data having a stringent delay requirement to the PCell which enables low delay transmission and assign data other than the data having a stringent delay requirement (including the data having a moderate delay requirement) to the SCell. In this way, data transmission that satisfies the delay requirement becomes possible in the PCell. Furthermore, although delays caused by a configuration change of BHSFs or the like or A/N transmission delay may occur in the SCell, the delay requirement of data transmitted in the SCell is not stringent, and therefore there is a high probability that the delay requirement of the data will be satisfied. In this way, data transmission that satisfies the delay requirement or QoS becomes possible through a backhaul between base station 100 and relay station 200.

Furthermore, since relay station 200 bundles only A/N signals for downlink data received in the SCell, base station 100 needs only to add DAI (information indicating the number of subframes assigned) to PDSCH assignment information of the SCell. Therefore, it is possible to reduce the overhead of resources (e.g., PDCCH (physical downlink control channel)) to which control information indicated from base station 100 to relay station 200 is mapped.

Moreover, in comparison of FIG. 2 with FIG. 7, UL BHSFs are configured as the fourth subframes from DL BHSFs of the PCell in FIG. 7 as in the case of FIG. 2. That is, in FIG. 7, the correspondence between DL BHSFs and UL BHSFs in the PCell is maintained as in the case of FIG. 2. That is, the configuration of BHSFs in the PCell is independent of a configuration change of DL BHSFs in the SCell. Thus, in subframes other than subframes configured as BHSFs in the PCell, base station 100 can perform communication directed to the terminal without being affected by the configuration of BHSFs in the SCell. That is, when carrier aggregation is performed between base station 100 and relay station 200, no radio resources are wasted in the PCell even when the configuration of BHSFs in the SCell is changed.

In this way, according to the present embodiment, when carrier aggregation is performed between the base station and the relay station, it is possible to individually configure BHSFs of the SCell without wasting radio resources and without changing BHSFs of the PCell.

Figure 8:
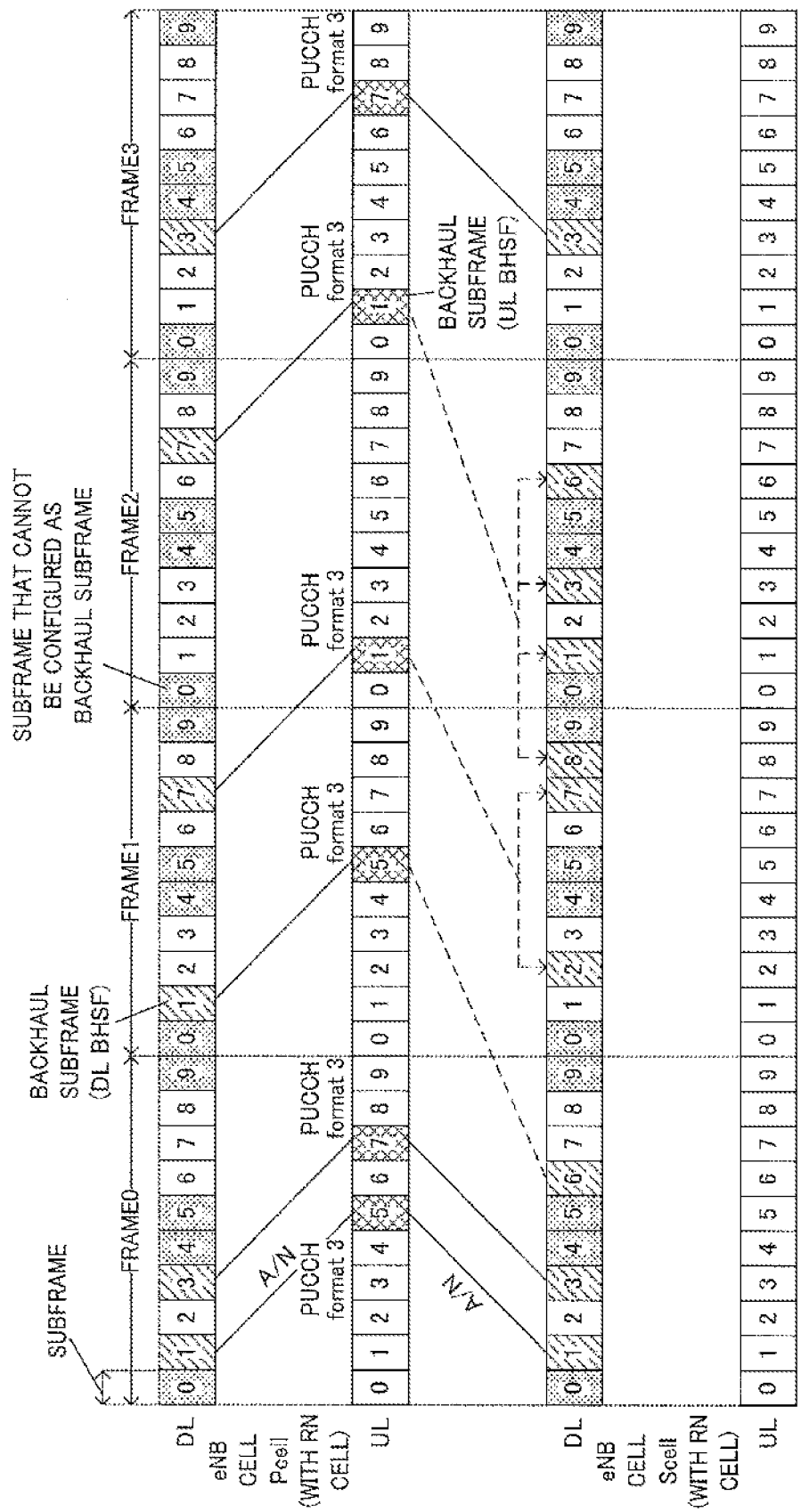
FIG. 8 illustrates another configuration example of BHSFs according to Embodiment 1 of the present invention.

A case has been described in the present embodiment where bundling is performed as the method of transmitting A/N signals. However, in the present embodiment, the method of transmitting A/N signals is not limited to bundling. For example, the relay station may also perform block encoding on a plurality of A/N signals to be transmitted in the same UL BHSF of the PCell and A/N signal for downlink data received in the PCell among A/N signals for downlink data received in the SCell and transmit the block-coded A/N signal using PUCCH format 3 (e.g., see FIG. 8). In block coding using PUCCH format 3, all A/N signals (all bits) to be transmitted are block-encoded and transmitted. This configuration allows the base station to individually determine whether or not retransmission of PDSCH in response to all A/N signals is necessary. That is, when an A/N signal for any one of PDSCHs is NACK as in the case of bundling, block coding using PUCCH format 3 can prevent loss of information on A/N signals for the remaining PDSCHs and retransmission of the remaining PDSCHs.

In the present embodiment, the processing by the base station and relay station in UL BHSFs where no data signal (PUSCH) exists has been described. However, in UL BHSFs where a data signal (PUSCH) exists, the relay station may time-multiplex all A/N signals transmitted in the UL BHSFs with PUSCH and transmit the multiplexed A/N signals. That is, when a PUSCH is assigned to the PCell, an A/N signal is transmitted using the PUSCH of the PCell and when a PUSCH is assigned to the SCell, an A/N signal is transmitted using the PUSCH of the SCell. In this case, A/N signals need not be bundled, and it is possible to prevent deterioration of transmission efficiency. Furthermore, since data transmitted from a relay station to a base station generally contains data from a plurality of terminals, the probability that a relay station will transmit uplink data (PUSCH) is high. For this reason, as described above, it is possible to improve the system throughput by multiplexing A/N signals with a PUSCH.

Furthermore, the embodiment has been described with a case where when carrier aggregation is performed, one SCell is configured for the relay station. However, the number of SCells configured for the relay station is not limited to one, and a plurality of SCells may be configured. In this case, the relay station may bundle a plurality of A/N signals for a plurality of downlink data items received in the SCells or bundle A/N signals for each SCell and then apply channel selection to A/N signals of the PCell and the plurality of SCells.

Furthermore, the present embodiment has been described with a case where channel selection (channel selection using a 2-bit table) is performed for one A/N signal (bundled A/N signal) obtained by bundling a plurality of A/N signals to be transmitted in the same UL BHSF of the PCell and one A/N signal for downlink data received in the PCell among A/N signals for downlink data received in the SCell. However, in the present embodiment, the mapping table (2-bit table, 3-bit table or the like) for channel selection may be changed in accordance with the number of A/N signals (the number of BHSFs of the SCell) to be transmitted in the same UL BHSF of the PCell among A/N signals for downlink data received in the SCell. This configuration allows the relay station to perform channel selection in accordance with the number of A/N signals in the SCell (the number of BHSFs in the SCell).

[Embodiment 2]

In Embodiment 2, a case will be described where, when carrier aggregation is applied to communication between a base station and a relay station, the relay station changes a method of transmitting A/N signals based on the number and positions of DL BHSFs configured in an SCell.

To be more specific, the relay station changes the method of transmitting A/N signals based on the number of DL BHSFs (the number of DL BHSFs targeted by A/N signals) of the SCell in which PDSCHs corresponding to A/N signals to be transmitted in the same UL BHSF of the PCell can be transmitted. In the following description, a transmission method using BPSK/QPSK, a transmission method using a combination of bundling and channel selection (N-bit table) and a transmission method using block coding using PUCCH format 3 are used as the method of transmitting A/N signals.

In the following description, "M" represents the number of DL BHSFs of the SCell in which PDSCHs corresponding to A/N signals to be transmitted in the same UL BHSF of the PCell can be transmitted.

Base station 100 (FIG. 5) according to the present embodiment is different from Embodiment 1 in the processing in control section 101, assignment information generating section 105 and A/N receiving section 109.

As in the case of Embodiment 1, control section 101 configures BHSFs (DL BHSFs and UL BHSFs) independently for each relay station 200 in CC units.

Furthermore, control section 101 configures PUCCH resources for A/N signal transmission for each UL BHSF configured in the PCell in accordance with the method of transmitting A/N signals. For example, when A/N signals are transmitted based on BPSK/QPSK transmission, control section 101 configures one A/N resource in a UL BHSF of the PCell. When A/N signals are transmitted based on a combination of bundling and channel selection, control section 101 configures two A/N resources (four A/N resources in the case of MIMO) in a UL BHSF of the PCell. Furthermore, when A/N signals are transmitted based on PUCCH format 3, control section 101 configures PUCCH format 3 corresponding to one channel in UL BHSFs of the PCell.

The method of transmitting A/N signals is determined in accordance with the to number of SCell DL BHSFs M in which PDSCHs corresponding to A/N signals transmitted in UL BHSFs can be transmitted. When, for example, M is 0 (there is no DL BHSF of the SCell targeted by an A/N signal of the UL BHSF and there is only an A/N signal of the PCell), BPSK/QPSK transmission is configured, and when M is equal to or more than 1 but less than a predetermined threshold K, a combination of bundling and channel selection is configured, and when M is equal to or more than K, transmission based on PUCCH format 3 (block coding) is configured.

FIG. 9 shows a correspondence between the aforementioned M and the method of transmitting A/N signals. Base station 100 and relay station 200 share the correspondence shown in FIG. 9. The threshold K may be a predetermined number or a variable that can be configured by base station 100.

The greater the threshold K, the higher the probability that a combination of bundling and channel selection will be configured, and deterioration of transmission efficiency caused by bundling will increase. On the other hand, the smaller the threshold K, the higher the probability that block coding using PUCCH format 3 for A/N signals will be configured, and the gain of block coding will decrease. Thus, base station 100 may determine the threshold K by taking into account a tradeoff relationship between the "deterioration of transmission efficiency caused by bundling" and the "gain of block coding." When an error correlation between subframes is high, for example, when a variation in the channel is moderate, the "deterioration of transmission efficiency caused by bundling" is small, and therefore base station 100 may increase the threshold K. On the other hand, when an error correlation between subframes is low, for example, when a variation in the channel is prominent, the "deterioration of transmission efficiency caused by bundling" is large, and therefore base station 100 may decrease the threshold K.

When the method of transmitting A/N signals is a combination of bundling and channel selection, assignment information generating section 105 includes DAI indicating the number of PDSCHs assigned to data corresponding to a plurality of A/N signals which are bundled in one UL BHSF in the PCell and transmitted as a bundled A/N signal in the assignment information on data transmitted in the SCell as in the case of Embodiment 1.

A/N receiving section 109 acquires information (not shown) on the method of transmitting A/N signals configured by control section 101. A/N receiving section 109 then makes an A/N determination on an A/N signal inputted from receiving section 108, based on the acquired method of transmitting A/N signals.

Relay station 200 (FIG. 6) according to the present embodiment is different from Embodiment 1 in the processing in A/N generating section 203 and mapping section 204.

A/N generating section 203 determines the method of transmitting A/N signals in accordance with the number of SCell DL BHSFs M to which PDSCHs corresponding to A/N signals to be transmitted in the same UL BHSF of the PCell can be assigned. For example, A/N generating section 203 maintains the correspondence between M and the method of transmitting A/N signals shown in FIG. 9. That is, A/N generating section 203 configures BPSK/QPSK transmission when M is 0, configures a combination of bundling and channel selection when M is equal to or more than 1 but less than the predetermined threshold K, and configures transmission based on PUCCH format 3 (block coding) when M is equal to or more than K. A/N generating section 203 generates A/N signals in accordance with the determined method of transmitting A/N signals.

Mapping section 204 maps the A/N signals generated in A/N generating section 203 to A/N resources configured by control section 101 of base station 100.

[Operations of Base Station 100 and Terminal 200]

Operations of base station 100 and terminal 200 configured as described above will be described.

Here, a case will be described where A/N signals are transmitted in UL BHSFs in which no data signal (PUSCH) exists as in the case of Embodiment 1 (FIG. 7). That is, a case will be described where A/N signals are transmitted using only a PUCCH of the PCell.

Moreover, a case will be described where two CCs (PCell and SCell) are configured for relay station 200 (FIG. 6). Furthermore, base station 100 and relay station 200 share the correspondence between M and the method of transmitting A/N signals shown in FIG. 9. Here, it is assumed that the threshold K shown in FIG. 9 is 4 as an example.

Figure 10:
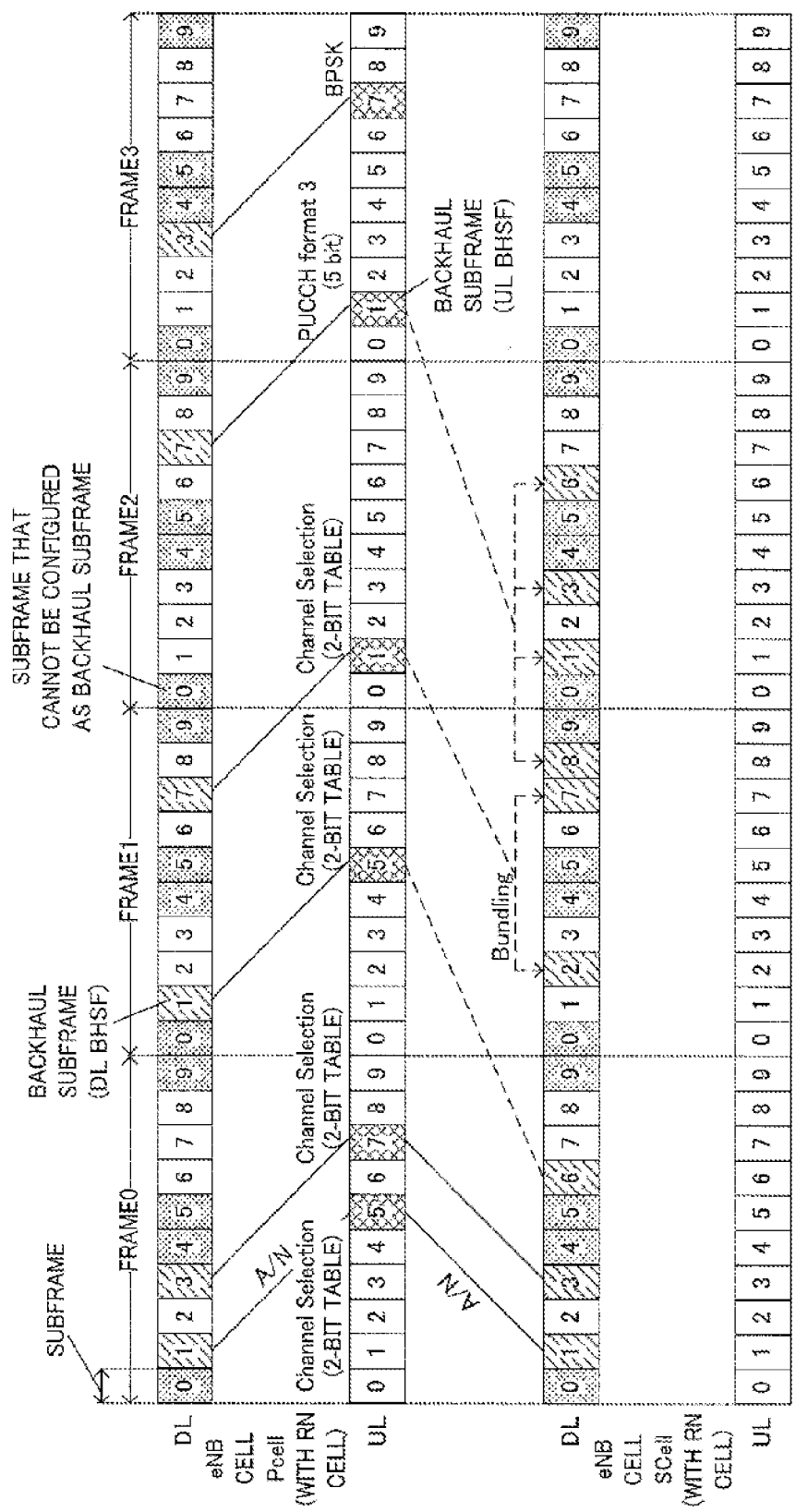
FIG. 10 illustrates a configuration example of BHSFs according to Embodiment 2 of the present invention.

In base station 100 (FIG. 5), control section 101 configures DL BHSFs independently for the PCell and SCell configured in relay station 200 (FIG. 6). Furthermore, in the PCell, control section 101 configures UL BHSFs at the fourth subframes from the DL BHSFs configured in the PCell For example, FIG. 10 shows a configuration example of BHSFs in the PCell and SCell configured in relay station 200. As shown in FIG. 10, control section 101 configures subframes 1 and 3 of frame 0, subframes 1 and 7 of frame 1, subframe 7 of frame 2 and subframe 3 of frame 3 as DL BHSFs in the downlink (DL) of the PCell. Furthermore, as shown in FIG. 10, in the PCell, control section 101 configures the fourth subframes from the DL BHSFs of the PCell as UL BHSFs. Furthermore, as shown in FIG. 10, control section 101 configures subframes 1, 3 and 6 of frame 0, subframes 2, 7 and 8 of frame 1 and subframes 1, 3 and 6 of frame 2 as DL BHSFs on the downlink (DL) of the SCell.

Furthermore, control section 101 of base station 100 and A/N generating section 203 of relay station 200 determine the method of transmitting A/N signals.

For example, attention is focused on subframes 5 and 7 of frame 0 and subframe 5 of frame 1 shown in FIG. 10. The A/N signals of the SCell respectively transmitted in UL BHSFs of the PCell configured in these subframes are only one A/N signal for downlink data (PDSCH) transmitted in DL BHSFs of the SCell configured in subframes 1 and 3 of frame 0 and subframe 6 of frame 1 (M=1). Thus, control section 101 and A/N generating section 203 determine a combination of bundling and channel selection as the method of transmitting A/N signals transmitted in the above UL BHSFs with reference to the table shown in FIG. 9. Here, an A/N signal is transmitted using channel selection with a 2-bit table in which a state of a 2-bit A/N signal of an A/N signal of the PCell and an A/N signal of the SCell ({ACK, ACK}, {ACK, NACK}, {NACK, ACK}, {NACK, NACK}) is associated with A/N resources (radio resources and constellation).

Similarly, attention is focused on subframe 1 of frame 2 shown in FIG. 10. A/N signals of the SCell transmitted in the UL BHSF of the PCell configured in this subframe are two A/N signals for downlink data (PDSCH) transmitted in DL BHSFs of the SCell configured in subframes 2 and 7 of frame 1 (M=2). Thus, control section 101 and A/N generating section 203 determine a combination of bundling and channel selection as the method of transmitting A/N signals to be transmitted in the above UL BHSFs with reference to the table shown in FIG. 9. Here, A/N generating section 203 bundles the two A/N signals of the SCell and applies channel selection with a 2-bit table to the bundled A/N signal and A/N signals of the PCell. When spatial multiplexing by MIMO is performed, channel selection with a 3-bit or 4-bit table may also be applied.

Similarly, attention is focused on subframe 1 of frame 3 shown in FIG. 10. A/N signals of the SCell transmitted in the UL BHSF of the PCell configured in this subframe are four A/N signals for downlink data (PDSCH) transmitted in DL BHSFs of the SCell configured in subframe 8 of frame 1 and subframes 1, 3 and 6 of frame 2 (M=4). Thus, control section 101 and A/N generating section 203 determine block coding using PUCCH format 3 as the method of transmitting A/N signals to be transmitted in the above UL BHSF with reference to the table shown in FIG. 9. That is, A/N generating section 203 performs block encoding on a total of five A/N signals (5bits); one A/N signal of the PCell and four A/N signals of the SCell as bits independent of each other and transmits the coded signal to base station 100 using PUCCH format 3.

Finally, attention is focused on subframe 7 of frame 3 shown in FIG. 10. There is no A/N signal of the SCell to be transmitted in a UL BHSF of the PCell configured in this subframe (M=0). Thus, control section 101 and A/N generating section 203 determine BPSK/QPSK transmission as the method of transmitting A/N signals to be transmitted in the above UL BHSF with reference to the table shown in FIG. 9. Here, A/N generating section 203 modulates one A/N signal of the PCell using BPSK. When spatial multiplexing by MIMO is performed, QPSK may be applied to a 2-bit A/N signal.

As described above, according to the present embodiment, transmitting section 205 in relay station 200 changes the method of transmitting A/N signals based on the number of DL BHSFs of the SCell targeted by A/N signals to be transmitted in the same UL BHSF of the PCell. Here, the number of DL BHSFs of the SCell is the number of DL BHSFs configured in the SCell during a period between a subframe located four subframes before the UL BHSF which is the transmission target this time and a subframe located after a subframe located four subframes before the UL BHSF which is the immediately preceding transmission target (that is, three subframes before the UL BHSF which is the immediately preceding transmission target). Furthermore, examples of the A/N transmission method include a method of bundling a plurality of A/N signals for a plurality of downlink data items of the SCell and transmitting the bundled signal and A/N signals for downlink data (PDSCH) received in the PCell using channel selection (bundling+channel selection), a method of block coding a plurality of A/N signals of the SCell and A/N signals of the PCell (block coding using PUCCH format 3) and a method of transmitting only A/N signals of the PCell (BPSK/QPSK transmission).

Accordingly, relay station 200 performs block coding when "M" is large (when M shown in FIG. 9 is equal to or more than the threshold K), and performs bundling when "M" is small (when M shown in FIG. 9 is less than the threshold K). When "M" is large (when the number of A/N signals is large), it is possible to prevent wasted retransmission caused by deterioration of transmission efficiency due to bundling, leading to deterioration of the throughput. On the other hand, when "M" is small (when the number of A/N signals is small), it is possible to suppress deterioration of block coding performance.

In the LTE-A system, an A/N signal during BPSK/QPSK transmission or one A/N resource used in channel selection is one of a maximum of 36 resources defined by a combination of 12 CSs (cyclic shifts) per resource block and three OCC (orthogonal cover code) sequences. Furthermore, the number of resources corresponding to the number of A/N signal bits is used as A/N resources. On the other hand, one A/N resource used in PUCCH format 3 is defined by one of five orthogonal sequences multiplexed in one resource block. That is, one A/N resource used in PUCCH format 3 requires more resources than one A/N resource used during BPSK/QPSK transmission and channel selection.

Therefore, as shown in the present embodiment, the effect of reducing the overhead in uplink is large, the effect being provided by relay station 200 changing the method of transmitting A/N signals in accordance with the number of DL BHSFs of the SCell in which PDSCH corresponding to an A/N signal to be transmitted in the same UL BHSF can be transmitted in the PCell.

Furthermore, in the present embodiment, base station 100 configures BHSFs at different timings for the PCell and SCell as in the case of Embodiment 1. Furthermore, when BHSFs are changed (added or deleted) in accordance with a change in the channel condition between base station 100 and relay station 200 or the number of terminals served by relay station 200, base station 100 changes only the configuration of BHSFs in the SCell while maintaining the configuration of BHSFs in the PCell to improve the system throughput.

Base station 100 can thereby change only the configuration of the SCell without changing the configuration of BHSFs of the PCell. Furthermore, since the transmission timing of fourth subframes from a DL BHSF can be maintained as a transmission timing of an A/N signal in the PCell, base station 100 and relay station 200 can perform transmission that satisfies quality requirements such as delay requirements (transmission with low delay). That is, in the present embodiment, data transmission that satisfies QoS is possible in the backhaul between base station 100 and relay station 200 as in the case of Embodiment 1. Furthermore, even when the configuration of BHSFs is changed in the SCell, no radio resource is wasted in the PCell.

Thus, according to the present embodiment, as in the case of Embodiment 1, when carrier aggregation is performed between the base station and the relay station, it is possible to individually configure BHSFs of the SCell without wasting radio resources and without changing BHSFs of the PCell. Furthermore, according to the present embodiment, changing the method of transmitting A/N signals in accordance with the number of A/N signals to be transmitted in the same UL BHSF in the PCell can keep the resource amount of PUCCH used for transmission of A/N signals low.

When performing block coding using PUCCH format 3, if the number of BHSFs in the SCell cannot be determined in the relay station, for example, in the middle of changing the configuration of the number of BHSFs in the SCell, PUCCH resources used for transmission of A/N signals may not be determined. Thus, in this case, even when PDSCH is transmitted only in the PCell, the relay station may not be able to normally transmit A/N signals. In the LTE-A system, indication of a configuration change of the number of BHSFs from the base station to the relay station requires a minimum of 15 ms. On the other hand, in BPSK/QPSK transmission and a combination of bundling and channel selection, if PDSCHs are assigned to only the PCell irrespective of the presence or absence of BHSFs in the SCell, the relay station transmits A/N signals using predetermined A/N resources. Thus, when transmitting an A/N signal at a timing in the middle of a configuration change of the number of BHSFs of the SCell, the relay station may switch between two transmission methods, i.e., BPSK/QPSK transmission and the combination of bundling and channel selection.

In order to solve the above problem when performing block coding using PUCCH format 3 in the middle of a configuration change of the number of BHSFs of the Sell, information indicating the presence or absence of assignment of PDSCH in the SCell which is the transmission target of an A/N signal in each UL BHSF may be included in the assignment information on PDSCH of the PCell. The base station indicates the assignment information to the relay station. This configuration allows the relay station to accurately determine the number of BHSFs of the Sell with reference to the assignment information even in the middle of a configuration change of the number of BHSFs of the Sell. When no PDSCH is assigned in the SCell, the relay station may transmit only A/N signals of the PCell based on BPSK/QPSK transmission and when PDSCHs are assigned in the SCell, the relay station may perform block encoding on A/N signals of the PCell and A/N signals of the SCell and transmit the coded signals.

Furthermore, a case has been described in the present embodiment where only one SCell is configured for one relay station, but two or more SCells may also be configured for one relay station. When a plurality of SCells are configured for one relay station, the number of BHSFs which become transmission targets of A/N signals in the SCell may be configured as M shown in FIG. 9.

The embodiments have been described thus far.

Furthermore, a base station may be called "NodeB," "eNodeB" or "donor eNB." A relay station may be called a "relay." Furthermore, a terminal may be called a "mobile station."

An A/N signal may include DTX in addition to ACK and NACK. When a relay station does not receive PDSCH data, the relay station determines the result of reception to be "DTX" and transmits the DTX to a base station.

In the foregoing embodiments, the present invention is configured with hardware by way of example, but the invention may also be provided by software in cooperation with hardware.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method for circuit integration is not limited to LSI's, and implementation using dedicated circuitry or general purpose processors is also possible. After fabrication of LSI, a field programmable gate array (FPGA), which is programmable, or a reconfigurable processor which allows reconfiguration of connections and settings of circuit cells in LSI may be used.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2011-099477, filed on Apr. 27, 2011, including the specification, drawings and abstract is incorporated herein by reference in its entirety.

INDUSTRIAL APPLICABILITY

The present invention is suitable for use in mobile communication systems, for example.

REFERENCE SIGNS LIST

100 Base station
101 Control section
102, 201, 210 Error correction coding section
103, 202, 211 Modulation section
105 Assignment information generating section
106, 204, 212 Mapping section
107, 205, 213 Transmitting section
108, 206, 214 Receiving section
109 A/N receiving section
110, 207, 215 Demodulation section
111, 208, 216 Error correction decoding section
200 Relay station
203 A/N generating section
209 Configuration section

The invention claimed is:

1. A relay station used in a communication system configured to use a primary component carrier (PCell) and a secondary component carrier (SCell) for backhaul communication between a base station and the relay station and to configure a first downlink backhaul subframe (DL BHSF) of the PCell used for backhaul communication in downlink and an uplink backhaul subframe (UL BHSF) of the PCell used for backhaul communication in uplink, the UL BHSF being a subframe located after a predetermined number of subframes from the first DL BHSF, the relay station comprising:

a generator that generates a response signal for a downlink signal received from the base station in each of the PCell and the SCell; and
a transmitting section that transmits the response signal using the PCell, wherein
the transmitting section transmits, in the UL BHSF of the PCell, the response signal for the downlink signal received using the PCell in the first DL BHSF and transmits, in the UL BHSF of the PCell, the response signal for the downlink signal received using the SCell in a second DL BHSF which is different from the first DL BHSF of the PCell,
wherein a plurality of first DL BHSFs and a plurality of UL BHSFs respectively corresponding to the plurality of first DL BHSFs are configured in the PCell;
the transmitting section transmits, in a transmission target subframe of the PCell, the response signal for the downlink signal received during a period between a first subframe which is located the predetermined number of subframes before the UL BHSF located the predetermined number of subframes minus one before the transmission target subframe and a second subframe which is located the predetermined number of subframes before the transmission target subframe, the transmission target subframe being a single subframe of the plurality of UL BHSFs;
the transmitting section selects a first transmission method of transmitting the response signal if a number of subframes assigned to a plurality of downlink signals received using the SCell from the base station within the period is equal to or larger than 1 and less than a threshold, selects a second transmission method of transmitting the response signal if the number of subframes is larger than the threshold, and selects a third transmission method of transmitting the response signal if the number of subframes is equal to zero,
wherein the threshold increases as an error correlation between the subframes increases;
the first transmission method is a method of bundling a plurality of response signals for the plurality of downlink signals and transmitting, using channel selection, the bundled signal and the response signal for the downlink signal received using the PCell;
the second transmission method is a method of performing block encoding on the plurality of response signals and the response signal for the downlink signal received using the PCell; and
the third transmission method is a method of transmitting only the response signal for the downlink signal received using the PCell.

2. The relay station according to claim 1, wherein:
the generator bundles the plurality of response signals for the plurality of downlink signals received using the SCell from the base station within the period; and
the transmitting section transmits, using channel selection, the bundled signal and the response signal for the downlink signal received using the PCell.

3. The relay station according to claim 1, further comprising a receiving section that receives, from the base station, the number of subframes assigned to the plurality of downlink signals received using the SCell from the base station within the period, wherein the generator bundles the plurality of response signals based on the number of subframes received.

4. The relay station according to claim 1, wherein the generator performs block encoding on the plurality of response signals for the plurality of downlink signals received using the SCell from the base station and the response signal for the downlink signal received using the PCell within the period.

5. A base station used in a communication system configured to use a primary component carrier (PCell) and a secondary component carrier (SCell) for backhaul communication between the base station and a relay station and to configure a first downlink backhaul subframe (DL BHSF) of the PCell used for backhaul communication in downlink and an uplink backhaul subframe (UL BHSF) of the PCell used for backhaul communication in uplink, the UL BHSF being a subframe located after a predetermined number of subframes from the first DL BHSF, the base station comprising:

a processor having one or more integrated circuits configured to assign a downlink signal for the relay station to each of the PCell and the SCell; and a receiving section that receives a response signal for the downlink signal using the PCell, wherein the receiving section receives, in the UL BHSF of the PCell, the response signal for the downlink signal transmitted using the PCell in the first DL BHSF and receives, in the UL BHSF of the PCell, the response signal for the downlink signal transmitted using the SCell in a second DL BHSF which is different from the first DL BHSF of the PCell, wherein a plurality of first DL BHSFs and a plurality of UL BHSFs respectively corresponding to the plurality of first DL BHSFs are configured in the PCell;

the receiving section receives, in a transmission target subframe of the PCell of the relay station, the response signal for the downlink signal transmitted during a period between a first subframe which is located the predetermined number of subframes before the UL BHSF located the predetermined number of subframes minus one before the transmission target subframe and a second subframe which is located the predetermined number of subframes before the transmission target subframe, the transmission target subframe being a single subframe of the plurality of UL BHSFs;

the receiving section selects a first transmission method of transmitting the response signal by the relay station if a number of subframes assigned to a plurality of downlink signals transmitted using the SCell from the base station within the period is equal to or larger than 1 and less than a threshold, selects a second transmission method of transmitting the response signal by the relay station if the number of subframes is larger than the threshold, and selects a third transmission method of transmitting the response signal by the relay station if the number of subframes is equal to zero, wherein the threshold increases as an error correlation between the subframes increases;

the first transmission method is a method of bundling a plurality of response signals for the plurality of downlink signals and transmitting, using channel selection, the bundled signal and the response signal for the downlink signal transmitted using the PCell of the relay station;

the second transmission method is a method of performing block encoding on the plurality of response signals and the response signal for the downlink signal transmitted using the PCell of the relay station; and the third transmission method is a method of transmitting only the response signal for the downlink signal transmitted using the PCell of the relay station.

6. A transmission method used in a communication system configured to use a primary component carrier (PCell) and a secondary component carrier (SCell) for backhaul communication between a base station and a relay station and to configure a first downlink backhaul subframe (DL BHSF) of the PCell used for backhaul communication in downlink and an uplink backhaul subframe (UL BHSF) of the PCell used for backhaul communication in uplink, the UL BHSF being a subframe located after a predetermined number of subframes from the first DL BHSF, the transmission method comprising:

generating a response signal for a downlink signal received from the base station using each of the PCell and the SCell; and transmitting, in the UL BHSF of the PCell, the response signal for the downlink signal received using the PCell in the first DL BHSF and transmitting, in the UL BHSF of the PCell, the response signal for the downlink signal received using the SCell in a second DL BHSF which is different from the first DL BHSF of the PCell, wherein a plurality of first DL BHSFs and a plurality of UL BHSFs respectively corresponding to the plurality of first DL BHSFs are configured in the PCell;

in a transmission target subframe of the PCell, the response signal for the downlink signal received during a period is transmitted, the period being a period between a first subframe which is located the predetermined number of subframes before the UL BHSF located the predetermined number of subframes minus one before the transmission target subframe and a second subframe which is located the predetermined number of subframes before the transmission target subframe, the transmission target subframe being a single subframe of the plurality of UL BHSFs;

a first transmission method of transmitting the response signal is selected if a number of subframes assigned to a plurality of downlink signals received using the SCell from the base station within the period is equal to or larger than 1 and less than a threshold, a second transmission method of transmitting the response signal is selected if the number of subframes is larger than the threshold, and a third transmission method of transmitting the response signal is selected if the number of subframes is equal to zero, wherein the threshold increases as an error correlation between the subframes increases;

the first transmission method is a method of bundling a plurality of response signals for the plurality of downlink signals and transmitting, using channel selection, the bundled signal and the response signal for the downlink signal received using the PCell;

the second transmission method is a method of performing block encoding on the plurality of response signals and the response signal for the downlink signal received using the PCell; and the third transmission method is a method of transmitting only the response signal for the downlink signal received using the PCell.

7. A reception method used in a communication system configured to use a primary component carrier (PCell) and a secondary component carrier (SCell) for backhaul communication between a base station and a relay station and to configure a first downlink backhaul subframe (DL BHSF) of the PCell used for backhaul communication in downlink and an uplink backhaul subframe (UL BHSF) of the PCell used for backhaul communication in uplink, the UL BHSF being a subframe located after a predetermined number of subframes from the first DL BHSF, the reception method comprising:

assigning a downlink signal for the relay station to each of the PCell and the SCell; and receiving, in the UL BHSF of the PCell, the response signal for the downlink signal transmitted using the PCell in the first DL BHSF and receiving, in the UL BHSF of the PCell, a response signal for the downlink signal transmitted using the SCell in a second DL BHSF which is different from the first DL BHSF of the PCell, wherein a plurality of first DL BHSFs and a plurality of UL BHSFs respectively corresponding to the plurality of first DL BHSFs are configured in the PCell;

in a transmission target subframe of the PCell of the relay station, the response signal for the downlink signal transmitted during a period is received, the period being a period between a first subframe which is located the predetermined number of subframes before the UL BHSF located the predetermined number of subframes minus one before the transmission target subframe and a second subframe which is located the predetermined number of subframes before the transmission target subframe, the transmission target subframe being a single subframe of the plurality of UL BHSFs;

a first transmission method of transmitting the response signal by the relay station is selected if a number of subframes assigned to a plurality of downlink signals transmitted using the SCell from the base station within the period is equal to or larger than 1 and less than a threshold, a second transmission method of transmitting the response signal by the relay station is selected if the number of subframes is larger than the threshold, a third transmission method of transmitting the response signal by the relay station is selected if the number of subframes is equal to zero, wherein the threshold increases as an error correlation between the subframes increases;

the first transmission method is a method of bundling a plurality of response signals for the plurality of downlink signals and transmitting, using channel selection, the bundled signal and the response signal for the downlink signal transmitted using the PCell of the relay station;

the second transmission method is a method of performing block encoding on the plurality of response signals and the response signal for the downlink signal transmitted using the PCell of the relay station; and the third transmission method is a method of transmitting only the response signal for the downlink signal transmitted using the PCell of the relay station.

\* \* \* \* \*